United States Patent
Yin et al.

(10) Patent No.: US 12,420,448 B2
(45) Date of Patent: Sep. 23, 2025

(54) PRECAST BASE, METHOD OF MANUFACTURING THE PRECAST BASE AND METHOD OF INSTALLING ARCHITECTURAL STRUCTURE HAVING THE PRECAST BASE

(71) Applicant: RUENTEX ENGINEERING & CONSTRUCTION CO., LTD., Taipei (TW)

(72) Inventors: Samuel Yin, Taipei (TW); Tzu-Liang Wu, Taipei (TW); Jui-Chen Wang, Taipei (TW); Jhih-Syuan Chen, Taipei (TW)

(73) Assignee: RUENTEX ENGINEERING & CONSTRUCTION CO., LTD., Taipei (TW)

( * ) Notice: Subject to any disclaimer, the term of this patent is extended or adjusted under 35 U.S.C. 154(b) by 83 days.

(21) Appl. No.: 18/381,353

(22) Filed: Oct. 18, 2023

(65) Prior Publication Data

US 2024/0309985 A1  Sep. 19, 2024

(30) Foreign Application Priority Data

Mar. 13, 2023  (TW) .................................. 112109101

(51) Int. Cl.
  B28B 23/00 (2006.01)
  F16M 5/00 (2006.01)
(52) U.S. Cl.
  CPC ............... *B28B 23/00* (2013.01); *F16M 5/00* (2013.01)

(58) Field of Classification Search
  CPC ..... B28B 23/00; B28B 23/022; B28B 23/005; E02D 2250/0007
  See application file for complete search history.

(56) References Cited

U.S. PATENT DOCUMENTS

| | | | | | |
|---|---|---|---|---|---|
| 3,705,469 | A | * | 12/1972 | Eriksson | E04B 1/4121 52/577 |
| 4,017,115 | A | * | 4/1977 | Holt | E04G 15/061 411/21 |
| 4,195,709 | A | * | 4/1980 | Gianotti | E06C 9/04 52/698 |
| 5,242,249 | A | * | 9/1993 | Grayson | E04G 21/142 52/630 |

(Continued)

FOREIGN PATENT DOCUMENTS

| | | | |
|---|---|---|---|
| CN | 107254884 A | * | 10/2017 |
| CN | 111379269 A | | 7/2020 |

(Continued)

*Primary Examiner* — Eret C McNichols
(74) *Attorney, Agent, or Firm* — Juan Carlos A. Marquez; Marquez IP Law Office, PLLC

(57) ABSTRACT

The present disclosure relates to a precast base. The precast base comprises a precast concrete body, a plurality of corrugated steel pipes, and a lifting part. The precast concrete body comprises a top surface, a bottom surface opposite to the top surface, and a plurality of mounting holes, each of which penetrates from the top surface to the bottom surface of the precast concrete body. The plurality of corrugated steel pipes are respectively embedded in the plurality of mounting holes. The lifting part is embedded in the top surface of the precast concrete body and is close to the center of the top surface.

12 Claims, 22 Drawing Sheets

(56) References Cited

U.S. PATENT DOCUMENTS

| | | | | |
|---|---|---|---|---|
| 5,332,191 | A * | 7/1994 | Nolan | B28B 7/02 |
| | | | | 249/4 |
| 5,809,732 | A * | 9/1998 | Farmer, Sr | B28B 23/0056 |
| | | | | 52/600 |
| 6,925,769 | B2 * | 8/2005 | Schmaltz, Jr. | E04G 21/185 |
| | | | | 52/576 |
| 8,006,448 | B2 * | 8/2011 | Peterson | B32B 3/266 |
| | | | | 52/309.11 |
| 8,875,471 | B2 * | 11/2014 | Siqueiros | E04B 1/3511 |
| | | | | 52/707 |
| 9,097,001 | B2 * | 8/2015 | Espinosa | E04B 1/2604 |
| 9,103,075 | B2 * | 8/2015 | Kaylor | E01C 11/16 |
| 11,155,976 | B1 * | 10/2021 | Gillen | E04H 12/16 |
| 11,549,273 | B2 * | 1/2023 | Jablonsky | E04B 1/4157 |
| 2011/0120036 | A1 * | 5/2011 | Wignall | E04B 5/43 |
| | | | | 249/188 |
| 2021/0262227 | A1 * | 8/2021 | Hun | E04C 2/044 |
| 2021/0317653 | A1 * | 10/2021 | Garcia Castro | E04B 1/215 |
| 2023/0340745 | A1 * | 10/2023 | Ogorchock | E02B 17/025 |
| 2024/0309985 | A1 * | 9/2024 | Yin | F16M 7/00 |

FOREIGN PATENT DOCUMENTS

| | | | | |
|---|---|---|---|---|
| EP | 1160066 | A2 * | 12/2001 | B28B 23/005 |
| FR | 1563919 | A * | 4/1969 | |
| GB | 2315287 | A * | 1/1998 | B28B 23/005 |
| WO | WO-9525209 | A1 * | 9/1995 | B28B 23/005 |

\* cited by examiner

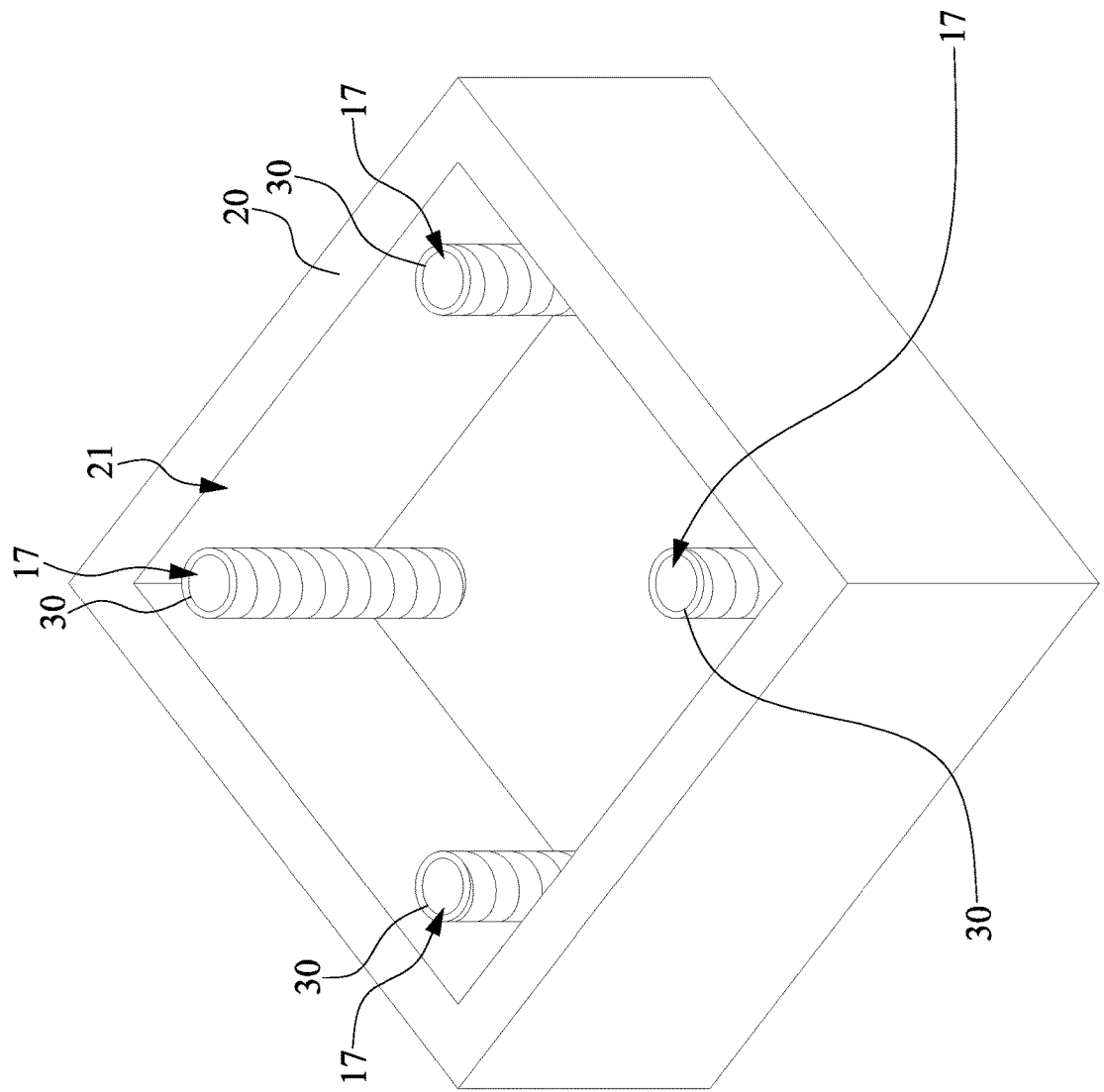
FIG. 2A
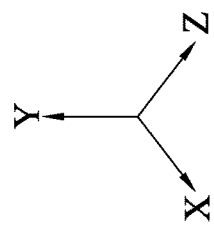

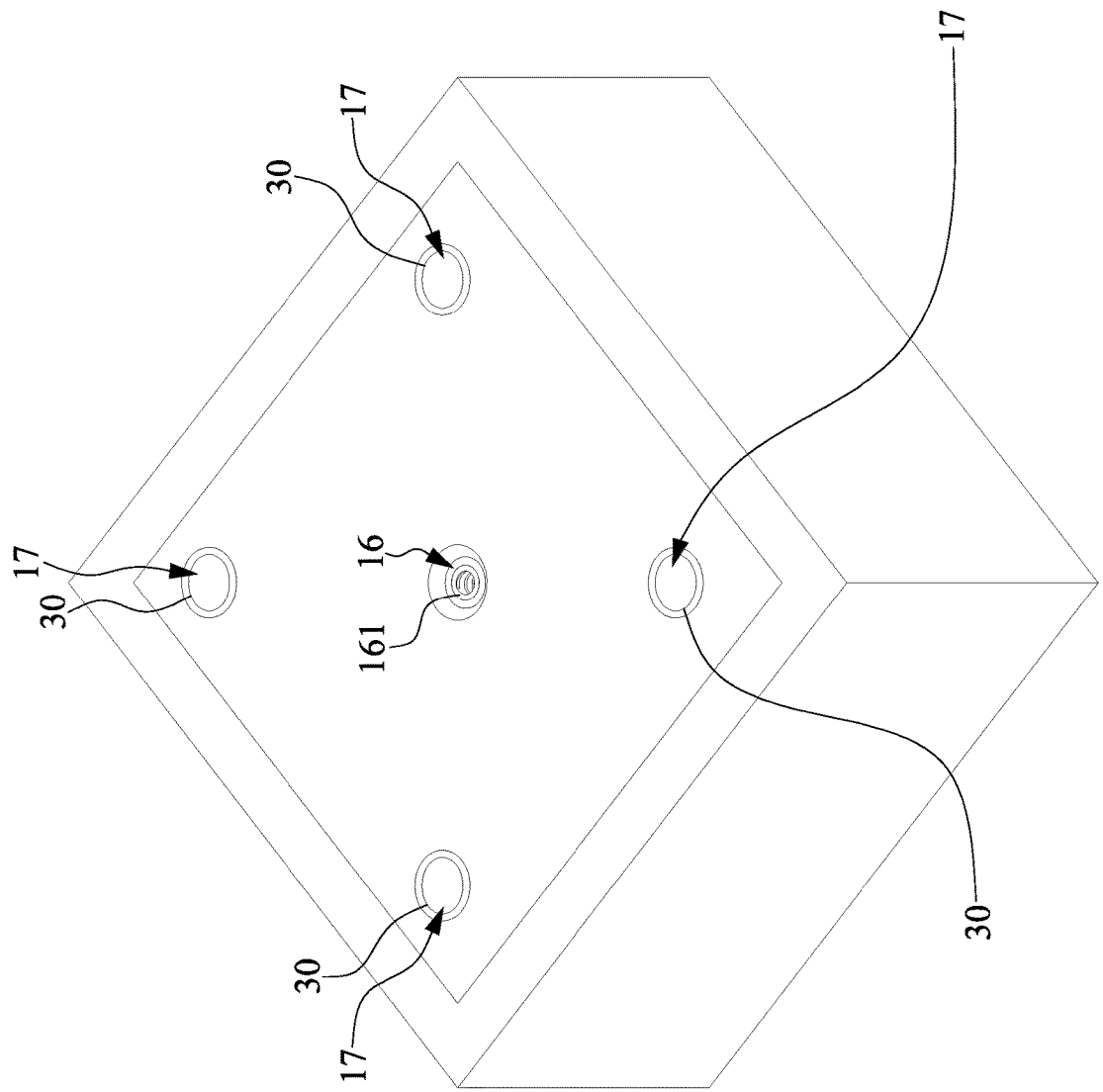
FIG. 2F
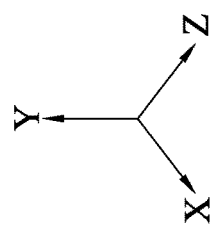

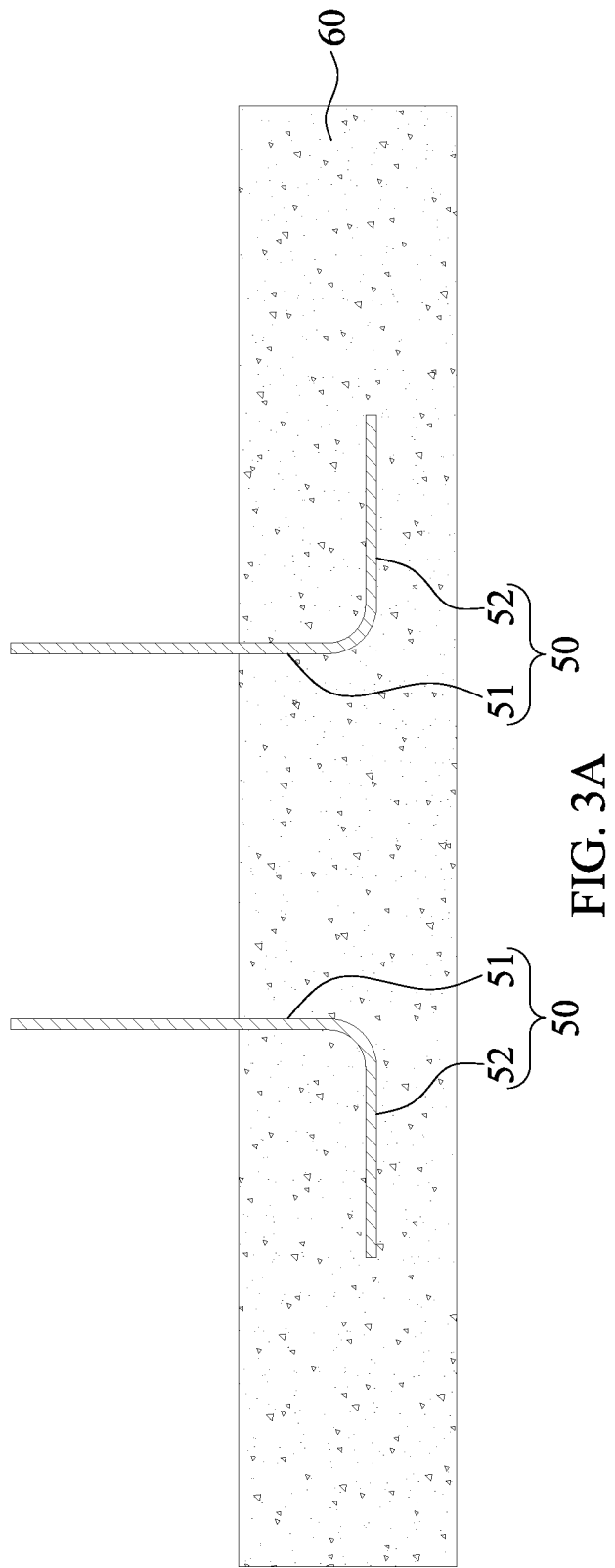

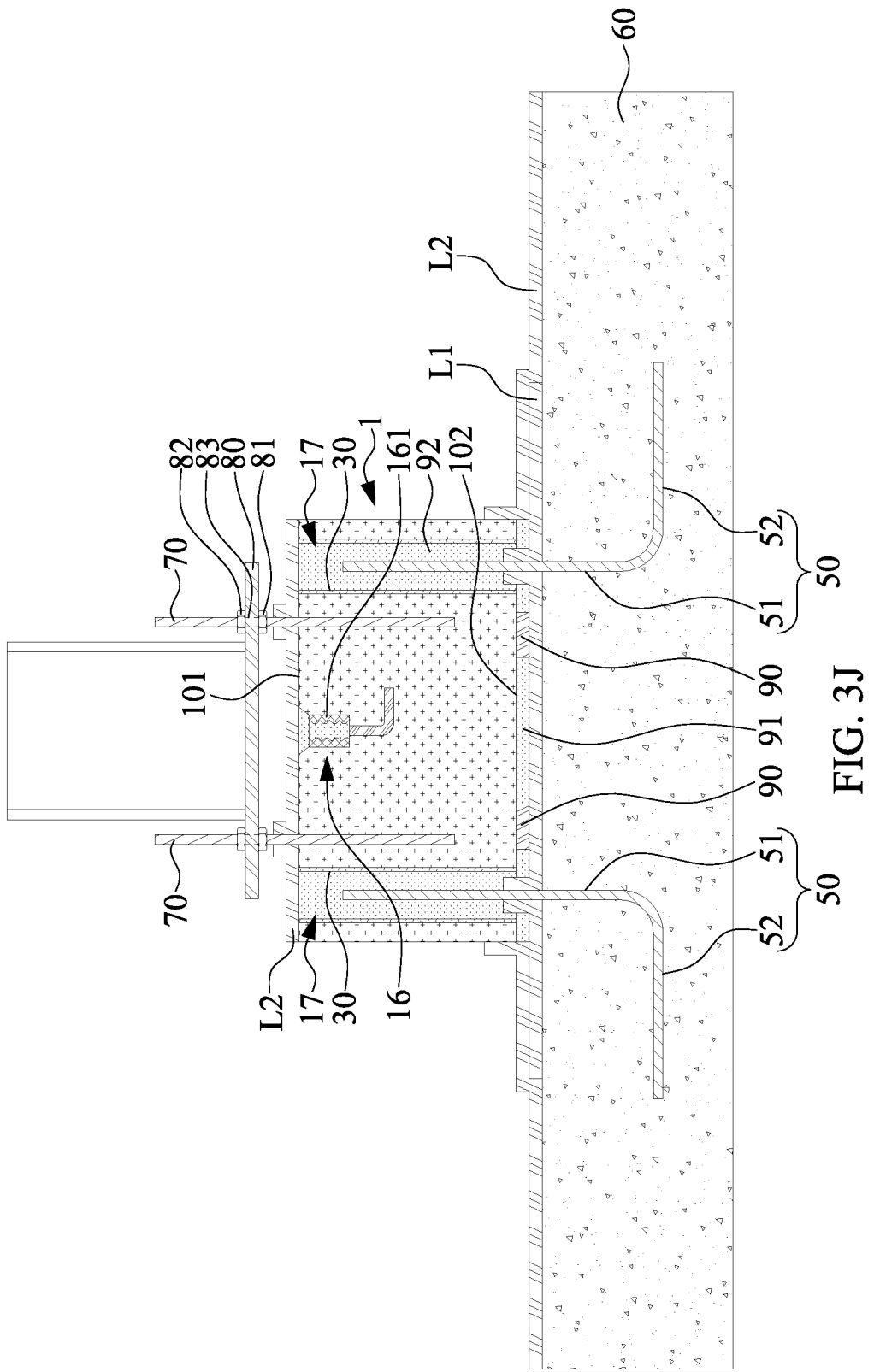

PRECAST BASE, METHOD OF MANUFACTURING THE PRECAST BASE AND METHOD OF INSTALLING ARCHITECTURAL STRUCTURE HAVING THE PRECAST BASE

BACKGROUND

Field of the Invention

The instant disclosure relates to a precast base, a method of manufacturing the precast base, and a method of installing an architectural structure having the precast base.

Description of Related Art

Concreate bases are commonly used on the rooftops of buildings to support specific structures, such as solar panels or wind turbines. Traditional bases need to be made on-site at construction sites. However, labor shortage is a serious issue for on-site construction, and due to unpredictable weather conditions, it is difficult to control the quality of on-site construction.

The construction industry has always aimed for rapid construction of high-quality buildings. Among the various construction methods, precast construction has been successfully applied in a wide range of building and construction projects due to its excellent quality control, speed, safety, and cost-effectiveness. A precast construction method involves using standardized processes to make steel cages, using modular molds or formwork in precast factories or on construction sites for concrete pouring. This enables fast and large-scale production of high-precision and high-quality structural components such as precast columns, precast beams, and precast slabs. Subsequently, these precast components are transported to the construction site and are precisely assembled with labor and/or machines. This minimizes the amount of work required on-site, reduces labor and construction time, and ultimately shortens the overall construction period. Additionally, this construction method can reduce or eliminate the need for scaffolding, significantly enhancing construction safety. Given these advantages, a precast base that can be systematically made has long been eagerly anticipated by the construction industry.

SUMMARY OF THE INVENTION

According to one exemplary embodiment of the instant disclosure, a precast base comprises a precast concrete body, a plurality of corrugated steel pipes, and a lifting part. The precast concrete body includes a top surface and a bottom surface opposite to the top surface, and a plurality of mounting holes, wherein each of the plurality of mounting holes penetrates from the top surface to the bottom surface of the precast concrete body. The plurality of corrugated steel pipes are respectively embedded in the plurality of mounting holes. The lifting part is embedded in and close to the center of the top surface of the precast concrete body.

According to another exemplary embodiment of the instant disclosure, a method for manufacturing a precast base comprises the following steps: providing a mold with a space, and disposing a plurality of corrugated steel pipes at corners of the periphery of the space; disposing a plurality of first U-shaped reinforcement bars at equal intervals in an X-axis direction, wherein openings of the plurality of first U-shaped reinforcement bars face a bottom of the space; disposing in parallel a plurality of second U-shaped reinforcement bars at equal intervals in a Z-axis direction, wherein openings of the plurality of second U-shaped reinforcement bars face the bottom of the space, and the plurality of second U-shaped reinforcement bars are substantially perpendicular to the plurality of first U-shaped reinforcement bars; disposing at least one third reinforcement bar to surround and fix to the sides of the plurality of first U-shaped reinforcement bars and the plurality of second U-shaped reinforcement bars; disposing a lifting part and fixing the lifting part to the plurality of first U-shaped reinforcement bars with a fourth reinforcement bar; and pouring concrete into the space of the mold.

According to another exemplary embodiment of the instant disclosure, a method of installing an architectural structure comprises the following steps: (a) embedding a plurality of reinforcement bars at a predetermined position in a first floor slab, wherein a portion of each of the plurality of reinforcement bars extends out of the floor slab; (b) lifting a precast base to the predetermined position, such that the portion of the plurality of reinforcement bars is respectively inserted into the plurality of mounting holes of the precast base; (c) disposing a plurality of elongated support members, wherein a portion of each of the plurality of elongated support members is fixedly inserted into the precast base, and the other portion extends out of the upper surface of the precast base; (d) respectively disposing a plurality of first bolts at a first height on the plurality of elongated support members; (e) disposing a supporting structure comprising a stand with a plurality of through-holes, such that the plurality of elongated support members are inserted through the plurality of through-holes of the stand, and a bottom of the stand rests on the plurality of first bolts; and (f) respectively disposing a plurality of second bolts at a second height on the plurality of elongated support members, and a bottom of the plurality of second bolts rests on the stand.

BRIEF DESCRIPTION OF THE DRAWINGS

The present disclosure as well as a preferred mode of use, further objectives, and advantages thereof will be best understood by referring to the following detailed description of illustrative embodiments in conjunction with the accompanying drawings, wherein:

FIGS. 2A to 2G are schematic views showing the steps for manufacturing the precast base of the instant disclosure;

FIGS. 3A to 3K are schematic views showing the steps for installing the precast base of the instant disclosure.

DETAILED DESCRIPTION OF THE PREFERRED EMBODIMENTS

Figure 1A:
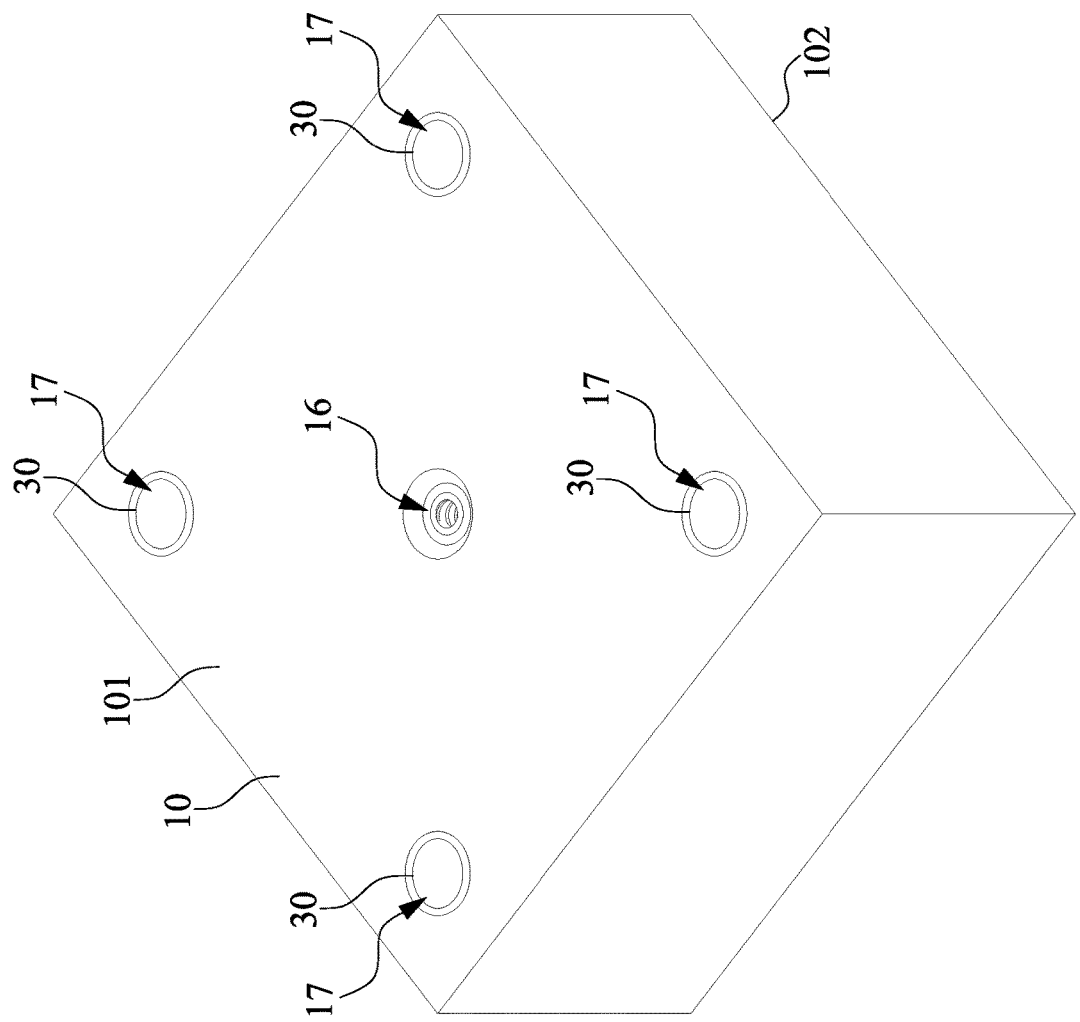
FIG. 1A is a schematic view showing a precast base of the instant disclosure.

The characteristics, subject matter, advantages, and effects of the present disclosure are detailed hereinafter by reference to embodiments of the present disclosure and the accompanying drawings. It is understood that the drawings referred to in the following description are intended only for purposes of illustration, and do not necessarily show the actual proportion and precise arrangement of the embodiments. Therefore, the proportion and arrangement shown in the drawings should not be construed as limiting or restricting the scope of the present disclosure.

Please refer to FIGS. 1A, 1B, 1C and 1D. A precast base 1 comprises a precast concrete body 10, a plurality of corrugated steel pipes 30, and a lifting part 16. The precast concrete body 10 is generally cuboid. The precast concrete body 10 includes a top surface 101, a bottom surface 102 opposite to the top surface 101, and a plurality of mounting holes 17 therein. Each of the mounting holes 17 extends from the top surface 101 to the bottom surface 102 of the precast concrete body 10, and the plurality of corrugated steel pipes 30 are embedded in the mounting holes 17, respectively. The lifting part 16 is embedded in and close to the center of the top surface 101 of the precast concrete body 10, for threadedly connecting a lifting ring 40 (as shown in FIG. 3E). In one embodiment of the instant disclosure, the precast base 1 has a length of approximately 50 cm, a width of approximately 50 cm, a height of approximately 28 cm, and a weight of approximately 170 kg.

Figure 1B:
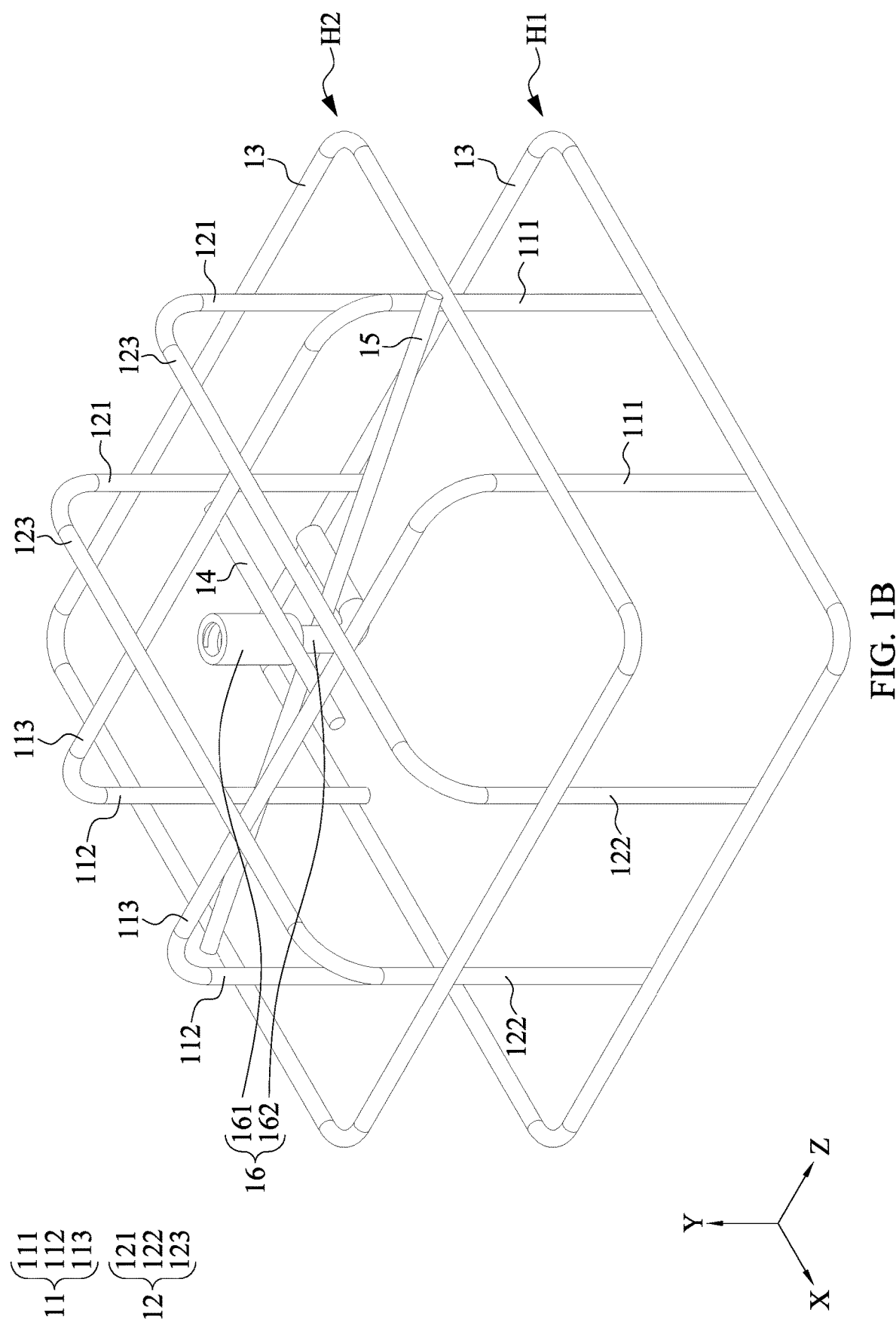
FIG. 1B is a schematic view showing the steel reinforcements in the precast base of FIG. 1A.
Figure 1C:
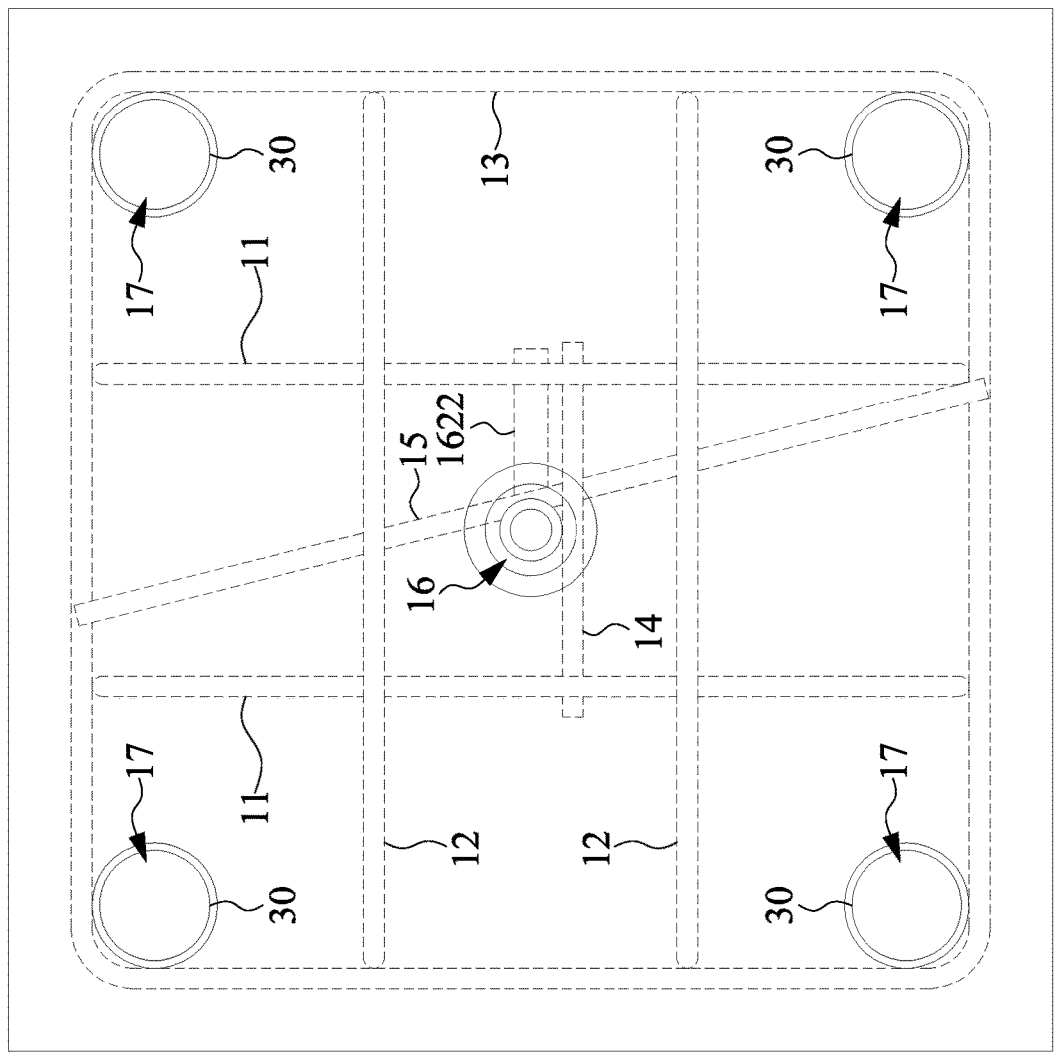
FIG. 1C is a top schematic view showing the internal structure of FIG. 1A.
Figure 1D:
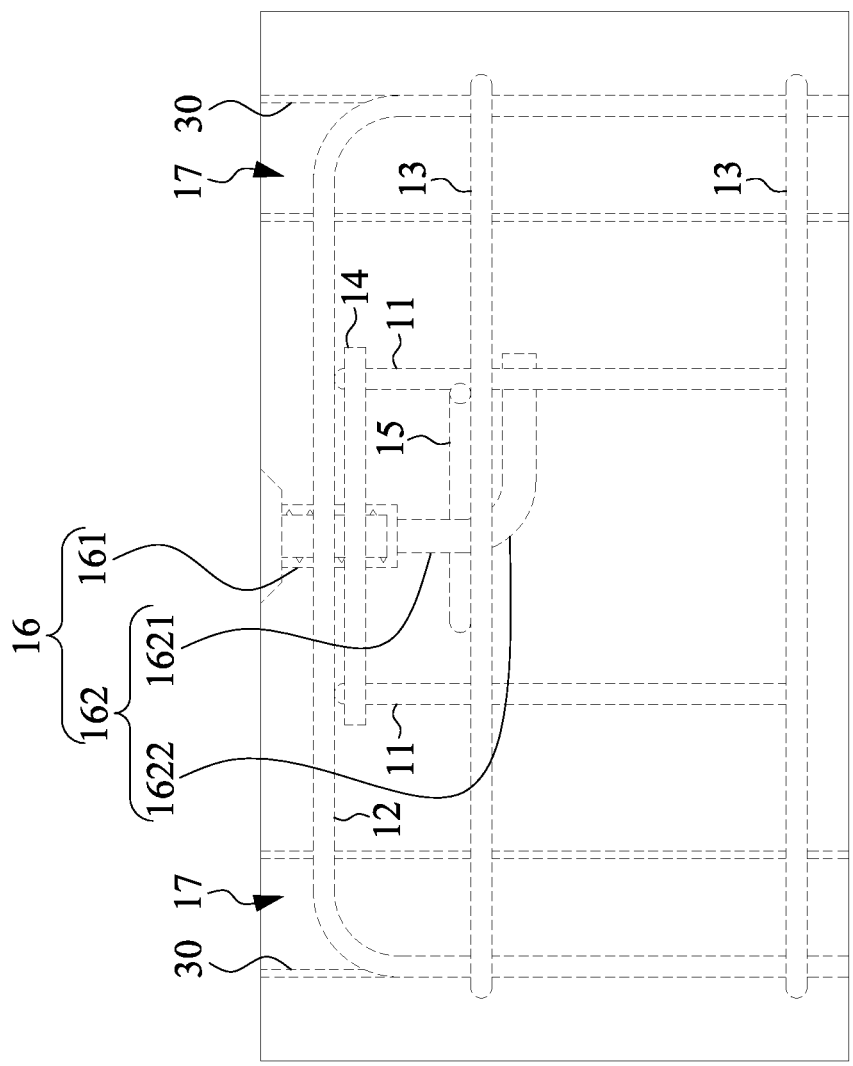
FIG. 1D is a side schematic view showing the internal structure of FIG. 1A.

Please refer to FIGS. 1B to 1D. The internal steel reinforcement structure of the precast concrete body 10 comprises a plurality of first U-shaped reinforcement bars 11, a plurality of second U-shaped reinforcement bars 12, several third reinforcement bars 13, a fourth reinforcement bar 14, and a fifth reinforcement bar 15.

The plurality of first U-shaped reinforcement bars 11 are bent from a regular straight bar and each of the plurality of first U-shaped reinforcement bars 11 has an opening. The plurality of first U-shaped reinforcement bars 11 are disposed in parallel at equal intervals with their openings facing the bottom surface 102 of the precast concrete body 10. Each of the plurality of first U-shaped reinforcement bars 11 comprises a first portion 111, a second portion 112, and a third portion 113. The first portion 111 extends in a Y-axis direction. The second portion 112 extends in the Y-axis direction. The third portion 113 extends in a Z-axis direction and connects ends of the first portion 111 and the second portion 112. Rounded corners are formed at the connection between the third portion 113 and the first portion 111, and at the connection between the third portion 113 and the second portion 112.

The plurality of second U-shaped reinforcement bars are bent from a regular straight bar and have an opening. The plurality of second U-shaped reinforcement bars are disposed in parallel at equal intervals with their openings facing the bottom surface 102 of the precast concrete body 10. The plurality of first U-shaped reinforcement bars 11 are substantially perpendicular to the plurality of second U-shaped reinforcement bars 12. Each of the plurality of second U-shaped reinforcement bars 12 comprises a first portion 121, a second portion 122, and a third portion 123. The first portion 121 extends in the Y-axis direction. The second portion 122 extends in the Y-axis direction. The third portion 123 extends in the X-axis direction and connects ends of the first portion 121 and the second portion 122. Rounded corners are formed at the connection between the third portion 123 and the first portion 121, and at the connection between the third portion 123 and the second portion 122. The third portion 113 of the first U-shaped reinforcement bar 11 is substantially perpendicular to the third portion 123 of the second U-shaped reinforcement bar 12.

The third reinforcement bar 13 is in a substantially square shape, with rounded corners. The third reinforcement bar 13 surrounds the sides of the plurality of first U-shaped reinforcement bars 11 and the sides of the plurality of second U-shaped reinforcement bars 12. In other words, the third reinforcement bar 13 is fixed to the first portion 111 and second portion 112 of the plurality of first U-shaped reinforcement bars 11, as well as the first portion 121 and second portion 122 of the plurality of second U-shaped reinforcement bars 12. In one embodiment of the instant disclosure, the plurality of third reinforcement bars 13 are arranged at different heights on the plurality of first U-shaped reinforcement bars 11 and the plurality of second U-shaped reinforcement bars 12, for example, at the first height H1 and second height H2 (as shown in FIG. 1B). The plurality of third reinforcement bars 13 are disposed in parallel at intervals, thereby enhancing the strength of the plurality of first U-shaped reinforcement bars 11 and the plurality of second U-shaped reinforcement bars 12.

The lifting part 16 is fixed to the plurality of first U-shaped reinforcement bars 11 through the fourth reinforcement bar 14. As shown in FIG. 1B, the lifting part 16 is fixed to two adjacent third portions 113 of one of the plurality of first U-shaped reinforcement bars 11 through the fourth reinforcement bar 14. In one embodiment of the instant disclosure, the fourth reinforcement bar 14 is substantially perpendicular to the third portion 113 of the plurality of first U-shaped reinforcement bars 11, or the fourth reinforcement bar 14 is substantially parallel to the third portion 123 of the plurality of second U-shaped reinforcement bars 12. Experimental results have shown that this connection offers excellent structural stability. The lifting part 16 comprises a connecting part 161 and a fixing part 162. The connecting part 161 is at the upper end of the lifting part 16 and has internal threads for threadedly connecting a lifting ring 40 (see FIG. 3E). The fixing part 162 is at the lower end of the lifting part 16 and has a head section 1621 and a tail section 1622 connected perpendicularly to the head section 1621, forming a substantially L shape (as shown in FIG. 1D). The fourth reinforcement bar 14 is fixed to the connecting part 161 or the head section 1621 of the fixing part 162. To enhance the fixation of the lifting part 16, in one embodiment, a fifth reinforcement bar 15 is provided, and fixed to at least one of the head section 1621 or the tail section 1622 of the fixing part 162, one of the plurality of first U-shaped reinforcement bars 11, and the third reinforcement bar 13. In one embodiment of the instant disclosure, one end of the fifth reinforcement bar 15 is fixed to the first portion 111 of one of the plurality of first U-shaped reinforcement bars 11, and the other end of the fifth reinforcement bar 15 is fixed to the third reinforcement bar 13, without being connected to the second portion 112 of the other one of the plurality of first U-shaped reinforcement bars 11, so that the fifth reinforcement bar 15 is not parallel to the third portion 113 of the plurality of first U-shaped reinforcement bars 11.

Please refer to FIGS. 2A to 2G, which are schematic views showing the steps of manufacturing a precast base 1 at different stages according to the instant disclosure.

As shown in FIG. 2A, a mold 20 with a space 21 therein is provided. A plurality of corrugated steel pipes 30 are positioned at the corners of the periphery of the space 21. In one embodiment of the instant disclosure, the mold 20 is made of metal, such as steel, iron, or aluminum alloy. The longitudinal length of the plurality of corrugated steel pipes 30 is approximately the same as or slightly shorter than the depth of the space 21. Additionally, the placement of the plurality of corrugated steel pipes 30 can be done before or after the mold 20 is set up. The tops of the plurality of corrugated steel pipes 30 are covered with removable caps (not shown) to prevent concrete from flowing into the interior of the corrugated steel pipes 30 during concrete pouring.

Figure 2B:
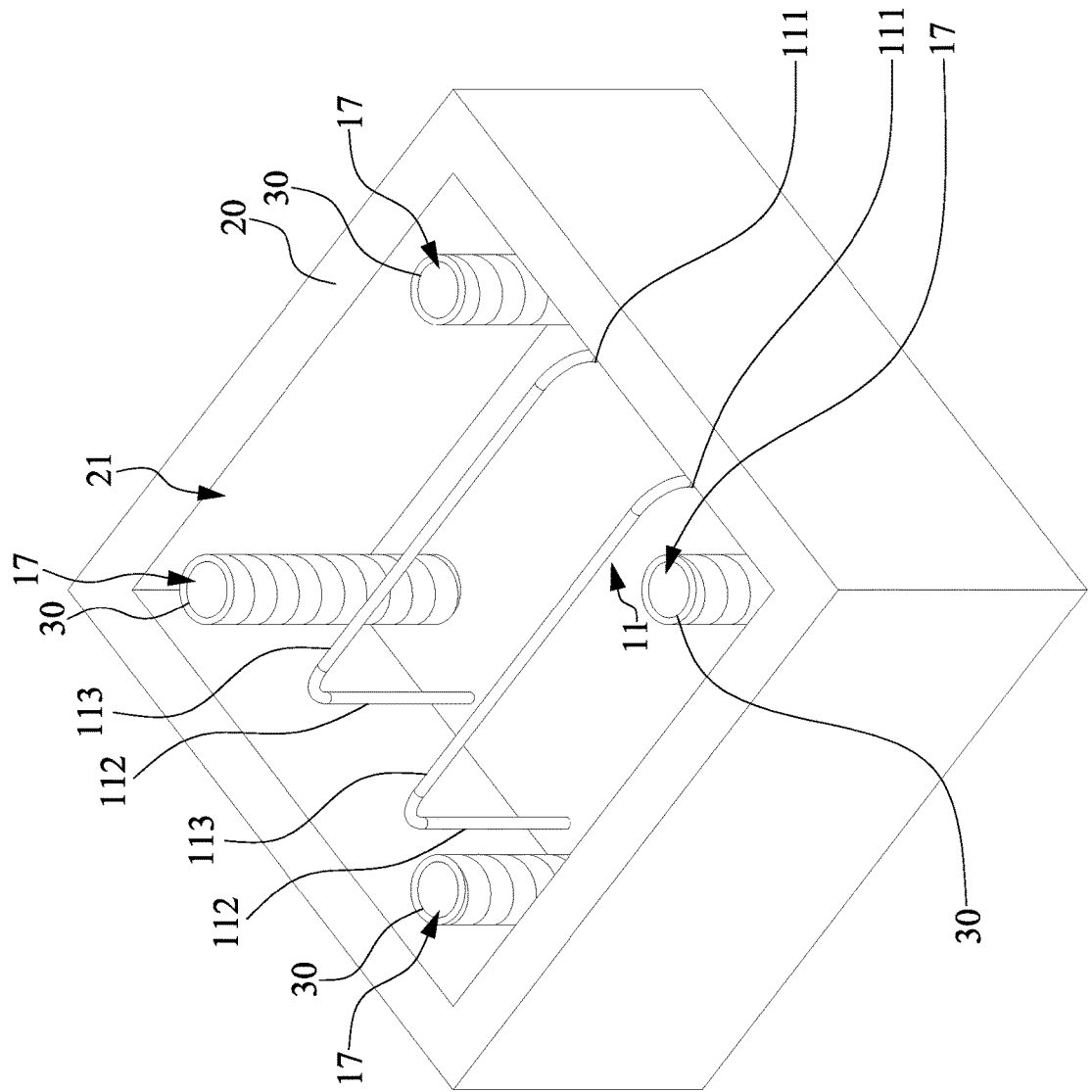

As shown in FIG. 2B, a plurality of first U-shaped reinforcement bars 11 are disposed in parallel at equal intervals in the X-axis direction. The plurality of first U-shaped reinforcement bars 11 are arranged in such a way that their openings face the bottom of the space 21. In one embodiment of the instant disclosure, since the height of the plurality of first U-shaped reinforcement bars 11 is shorter than the depth of the space 21, when the plurality of first U-shaped reinforcement bars 11 are arranged in the space 21, the position of the third portion 113 of the plurality of first U-shaped reinforcement bars 11 is lower than the top of the space 21.

Figure 2C:
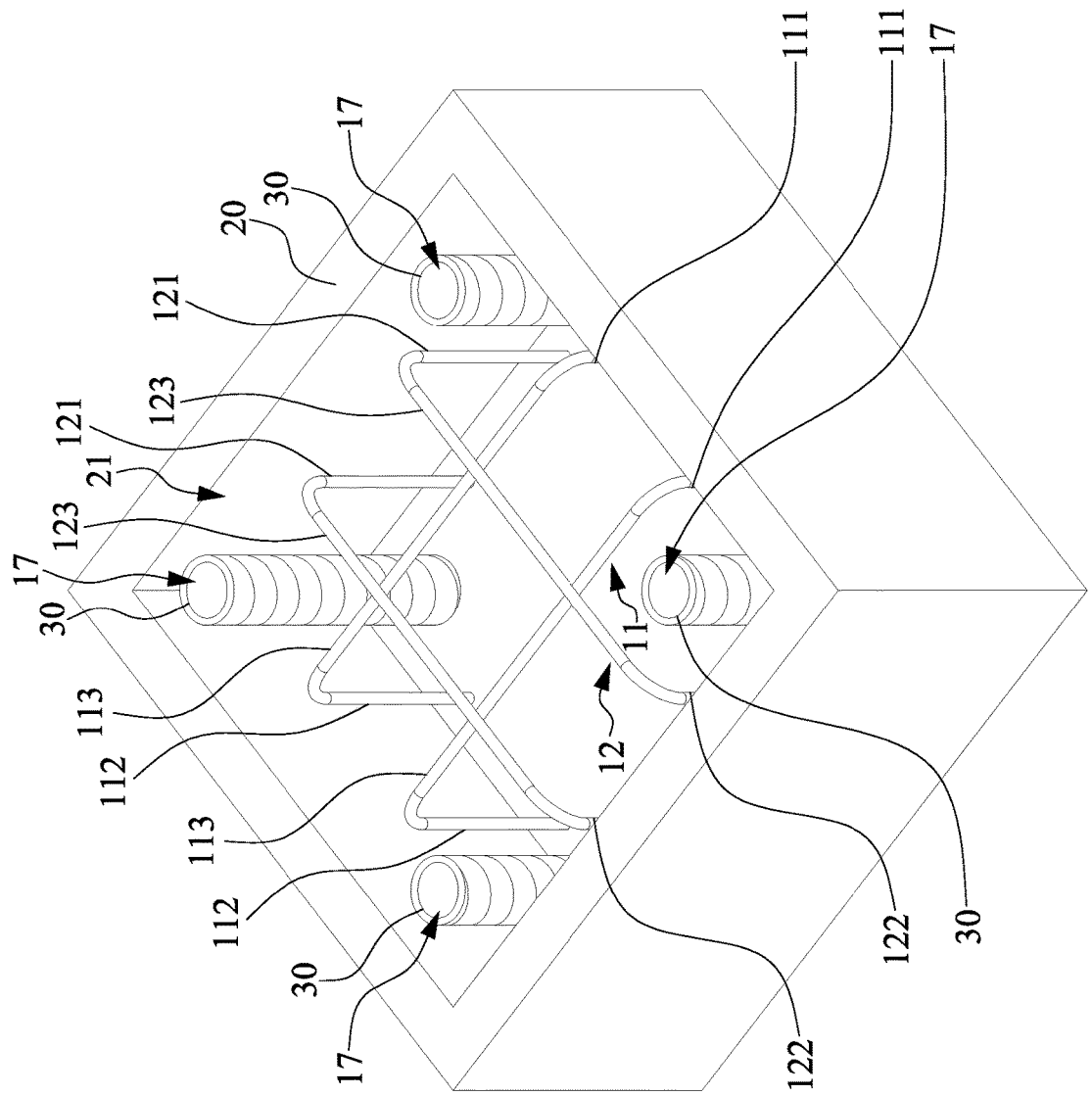

As shown in FIG. 2C, a plurality of second U-shaped reinforcement bars 12 are disposed in parallel at equal intervals in the Z-axis direction. The plurality of second U-shaped reinforcement bars 12 are disposed in parallel at equal intervals with their openings facing the bottom of the space 21, and are substantially perpendicular to the plurality of first U-shaped reinforcement bars 11. The third portion 123 of the plurality of second U-shaped reinforcement bars 12 is lap jointed with the third portion 113 of the plurality of first U-shaped reinforcement bars 11. The connections between the third portion 123 of the plurality of second U-shaped reinforcement bars 12 and the third portion 113 of the plurality of first U-shaped reinforcement bars 11 can be welded or bound by wires. In one embodiment of the instant disclosure, since the height of the plurality of second U-shaped reinforcement bars 12 is shorter than the depth of the space 21, when the plurality of second U-shaped reinforcement bars 12 are arranged in the space 21, the position of the third portion 123 of the plurality of second U-shaped reinforcement bars 12 is lower than the top of the space 21.

Figure 2D:
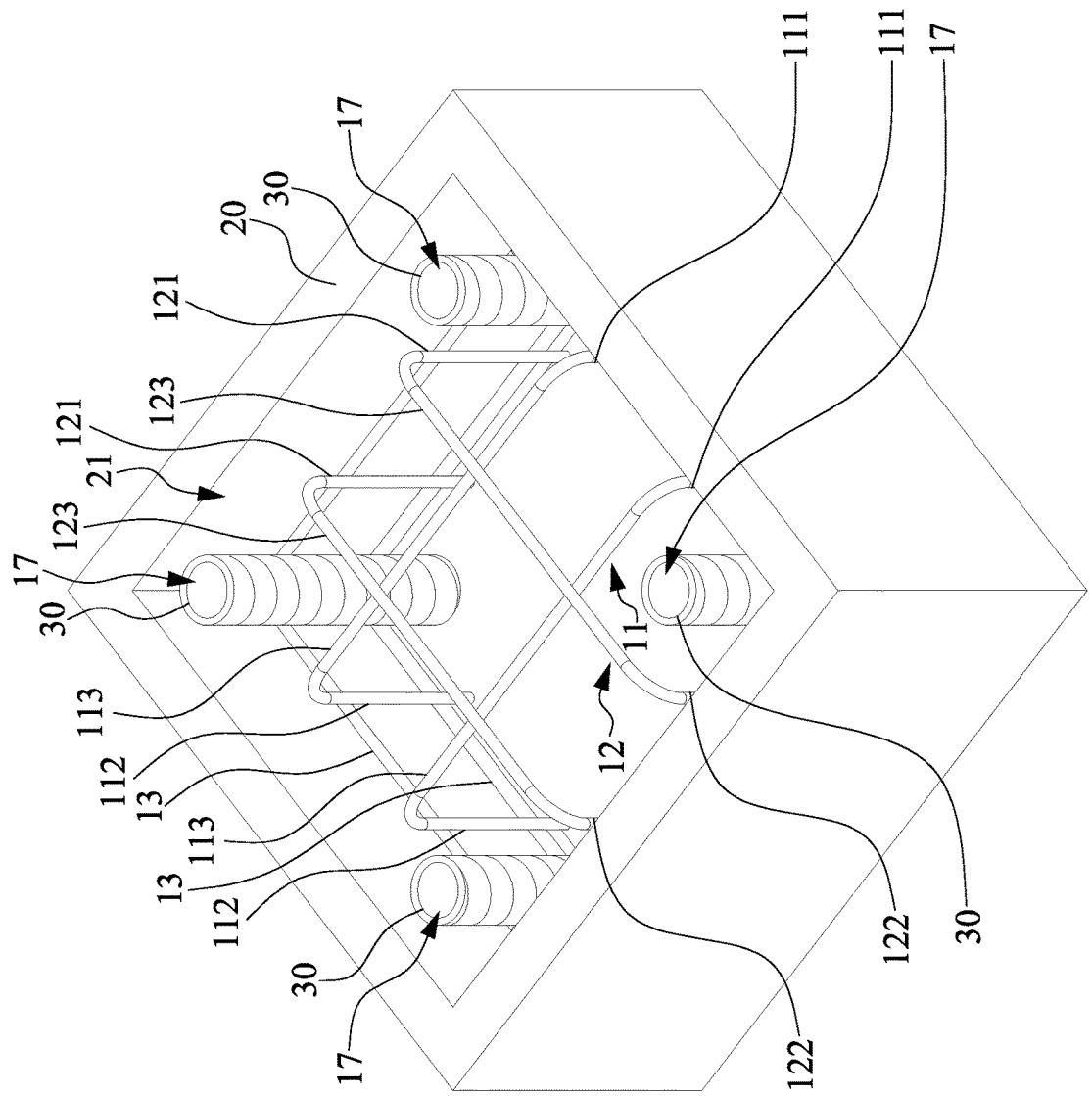

As shown in FIG. 2D, a third reinforcement bar 13 is disposed to surround the sides of a plurality of first U-shaped reinforcement bars 11 and a plurality of second U-shaped reinforcement bars 12. In one embodiment of the instant disclosure, a plurality of third reinforcement bars 13 are provided. For example, two third reinforcement bars 13 are disposed at the first height H1 and the second height H2 (as shown in FIG. 1B), and they are disposed in parallel. Then, the two third reinforcement bars 13 and the plurality of first U-shaped reinforcement bars 11 are fixed at the junctions with the first part 111 and the second part 112 of the first U-shaped reinforcement bars 11 by welding or wire fixing. Similarly, the plurality of third reinforcement bars 13 and the plurality of second U-shaped reinforcement bars 12 are fixed at the junction with the first portion 121 and the second portion 122 of the second U-shaped reinforcement bars 12 by welding or wire fixing.

Figure 2E:
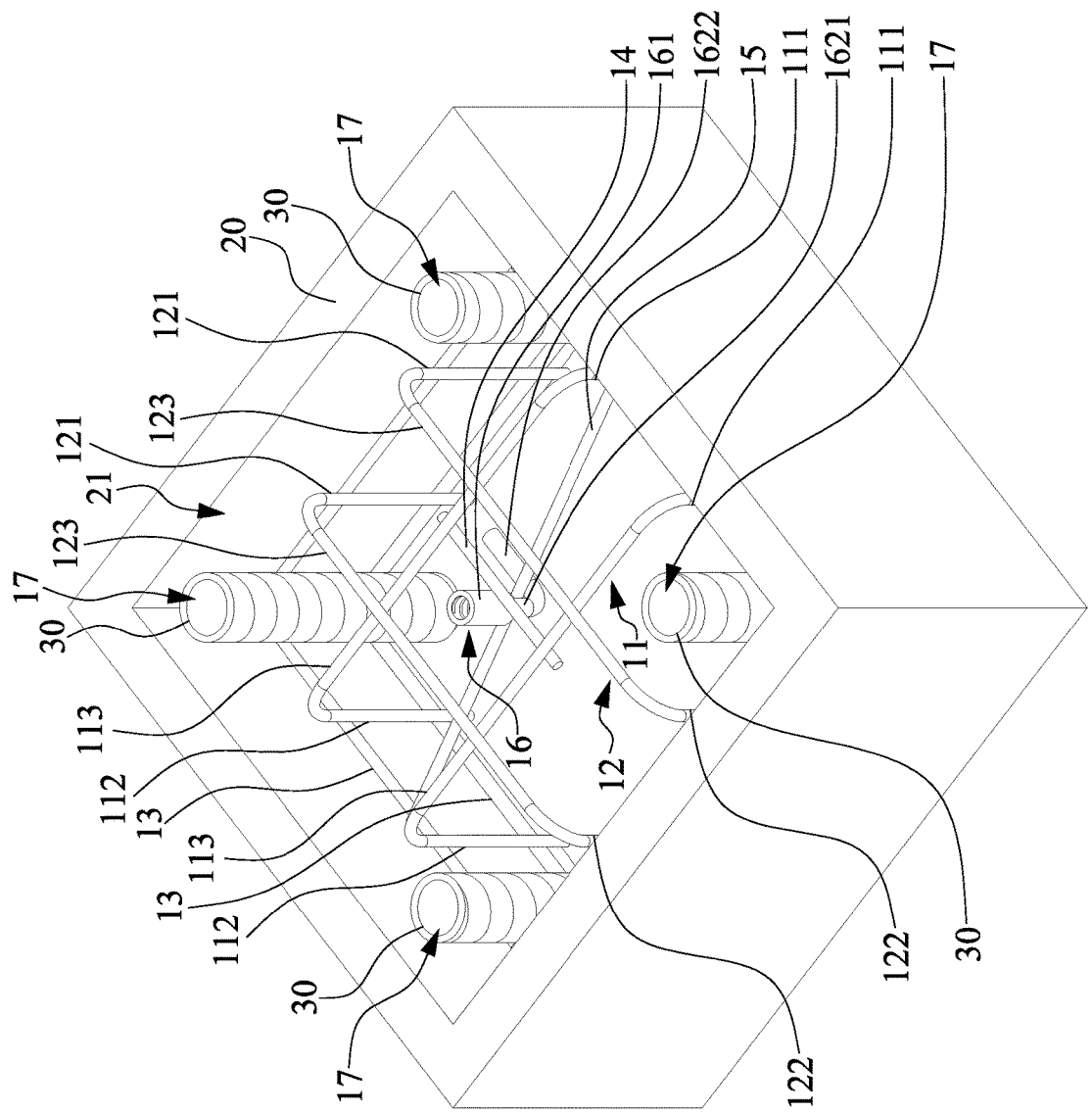

As shown in FIG. 2E, a lifting part 16 is disposed and fixed to a plurality of first U-shaped reinforcement bars 11 by a fourth reinforcement bar 14, so that the lifting part 16 is located between two adjacent first U-shaped reinforcement bars 11 and close to the center of the space 21. In this step, first, the approximate middle position of the fourth reinforcement bar 14 is fixed to the connecting part 161 or the fixing part 162 of the lifting part 16. The fourth reinforcement bar 14 and the connecting part 161 of the lifting part 16, or the connection between the fourth reinforcement bar 14 and the head section 1621 of the fixing part 162 are connected through welding. Then, one end of the fourth reinforcement bar 14 is connected to the third part 113 of one of the plurality of first U-shaped reinforcement bars 11, and the other end is connected to the third part 113 of the adjacent one of the plurality of first U-shaped reinforcement bars 11. The fourth reinforcement bar 14 and the third part 113 of the plurality of first U-shaped reinforcement bars 11 are connected through welding or wires. In another embodiment of the instant disclosure, the fourth reinforcement bar 14 can also be first fixed to the plurality of first U-shaped reinforcement bars 11, and then the lifting part 16 is fixed to the fourth reinforcement bar 14. In some embodiments, a fifth reinforcement bar 15 is provided, with one end of the fifth reinforcement bar 15 connected to the first part 111 of one of the plurality of first U-shaped reinforcement bars 11, the other end of the fifth reinforcement bar 15 fixed to the third reinforcement bar 13, and the approximate middle position of the fifth reinforcement bar 15 fixed to at least one of the head section 1621 and the tail section 1622 of the fixing part 162 of the lifting part 16. The fifth reinforcement bar 15 and the plurality of first U-shaped reinforcement bars 11, the third reinforcement bar 13, and the lifting part 16 are connected through welding or wires. In addition, before or after the lifting part 16 is fixed to the plurality of first U-shaped reinforcement bars 11, the top of the connecting part 161 of the lifting part 16 is covered with a removable cover (not shown) to prevent concrete from flowing into the connecting part 161 of the lifting part 16 during concrete pouring.

As shown in FIG. 2F, concrete is poured into the space 21 of mold 20 from above until the top of the concrete is approximately level with the stop of the space 21. During the pouring process, the top of the connecting part 161 of the lifting part 16 and the top of a plurality of corrugated steel pipes 30 are covered with removable covers (not shown).

Figure 2G:
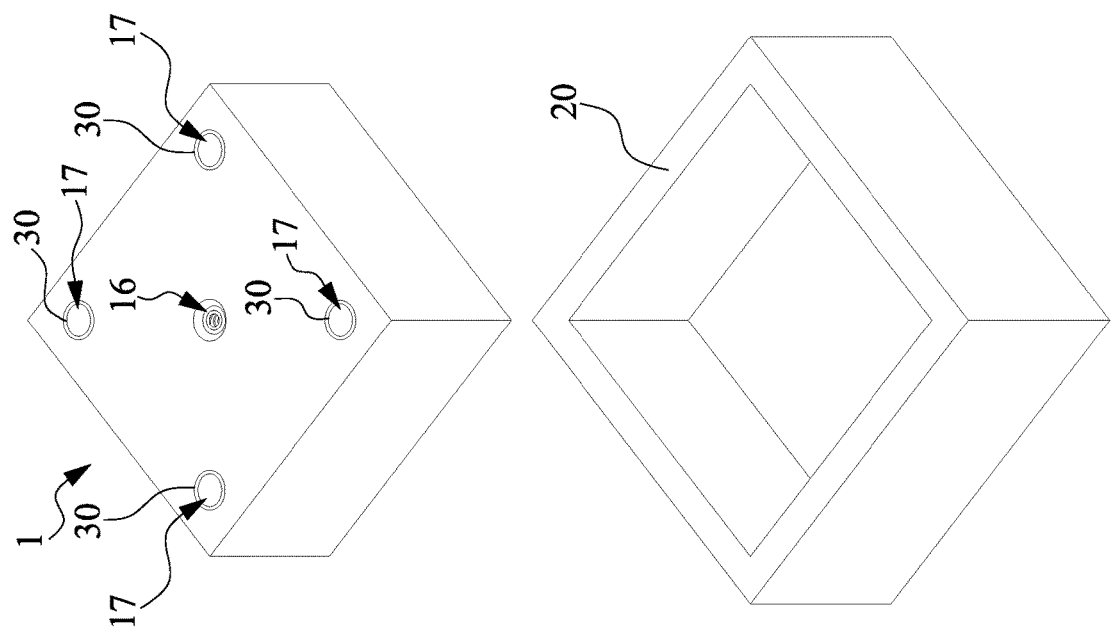

As shown in FIG. 2G, after the concrete has solidified, the mold 20 is removed to form the precast base 1. After the concrete has solidified, the plurality of removable covers on the top of the connecting part 161 of the lifting part 16 and the plurality of removable covers on the plurality of corrugated steel pipes 30 (not shown) are removed. Then, the lifting ring (not shown) is threaded into the connecting part 161 of the lifting part 16, and the lifting ring is pulled upward in the Y-axis direction so that the precast base 1 is separated from the mold 20.

Figure 3B:
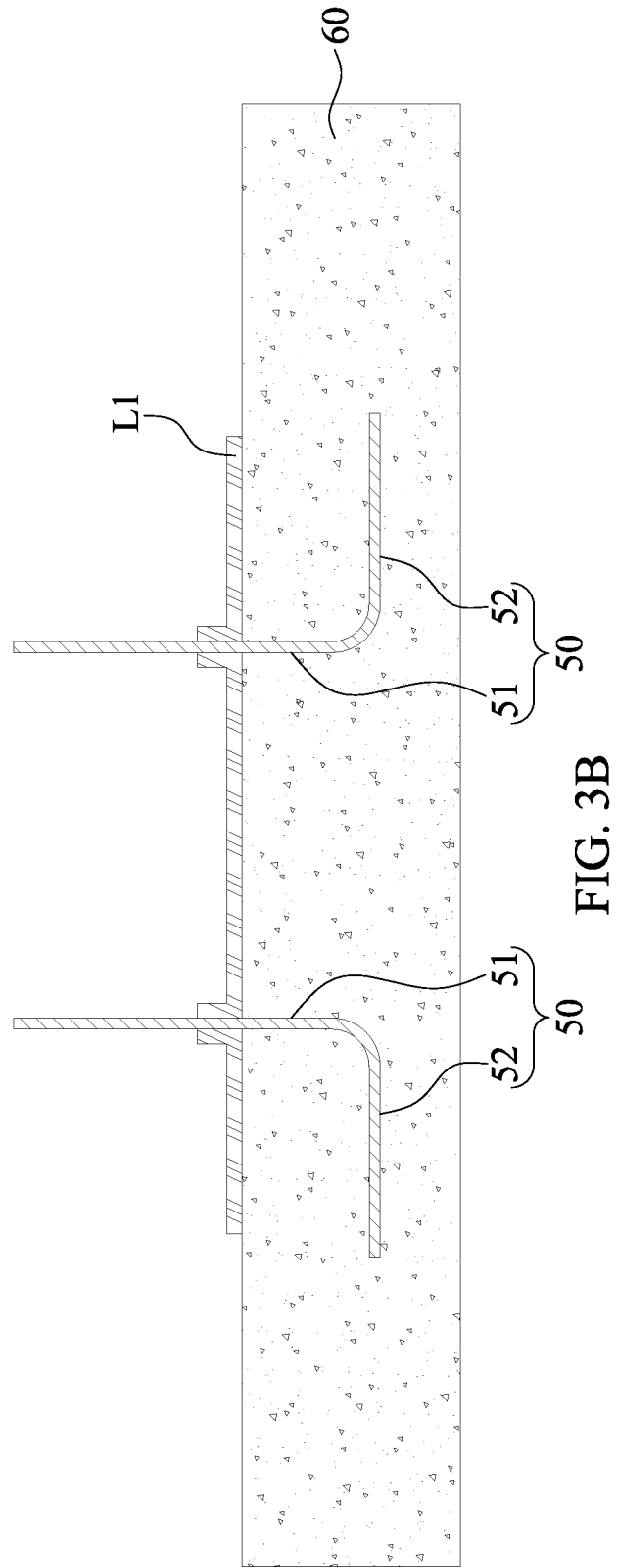
Figure 3C:
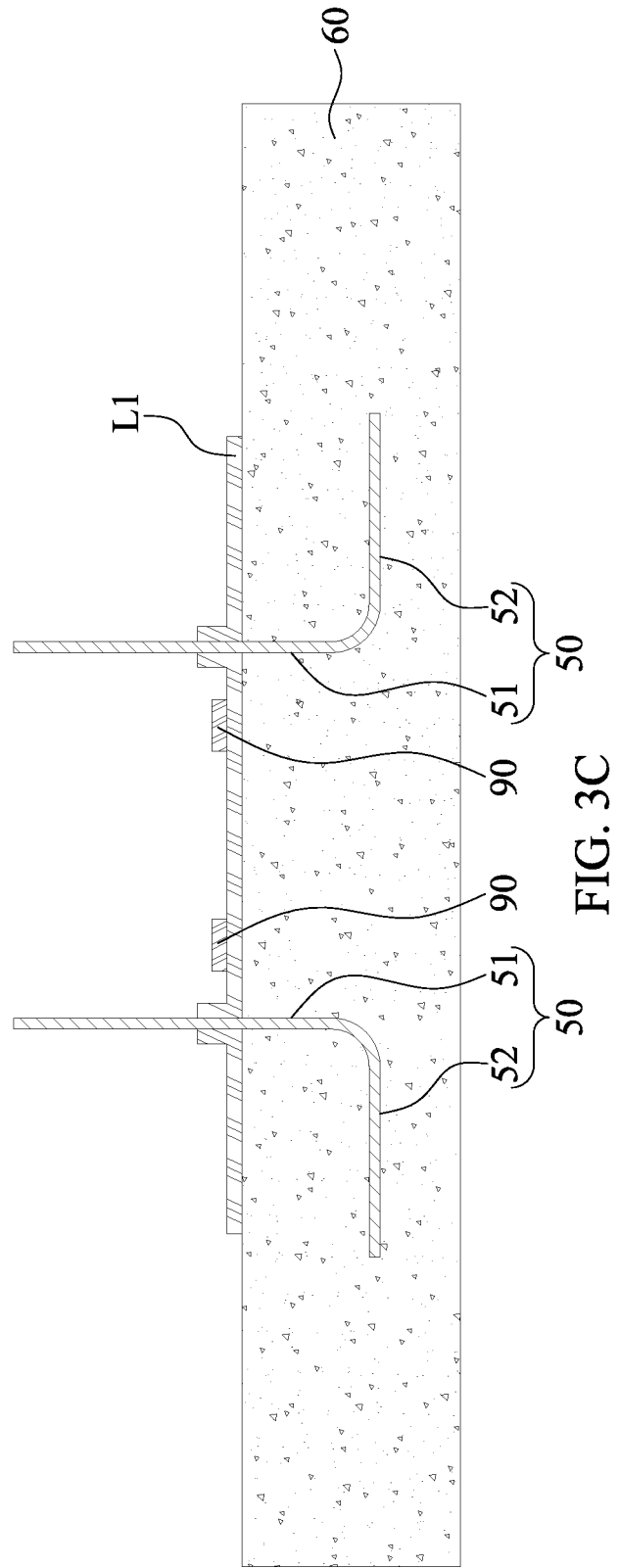
Figure 3D:
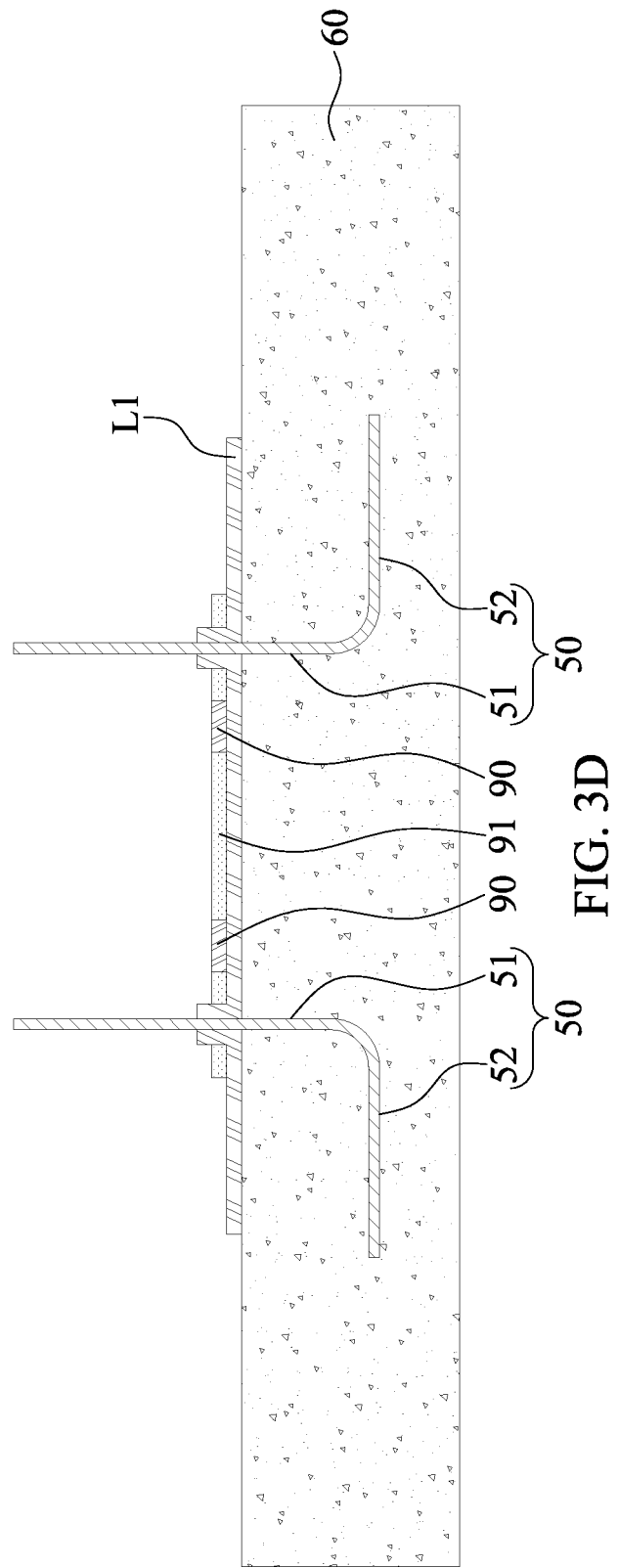
Figure 3E:
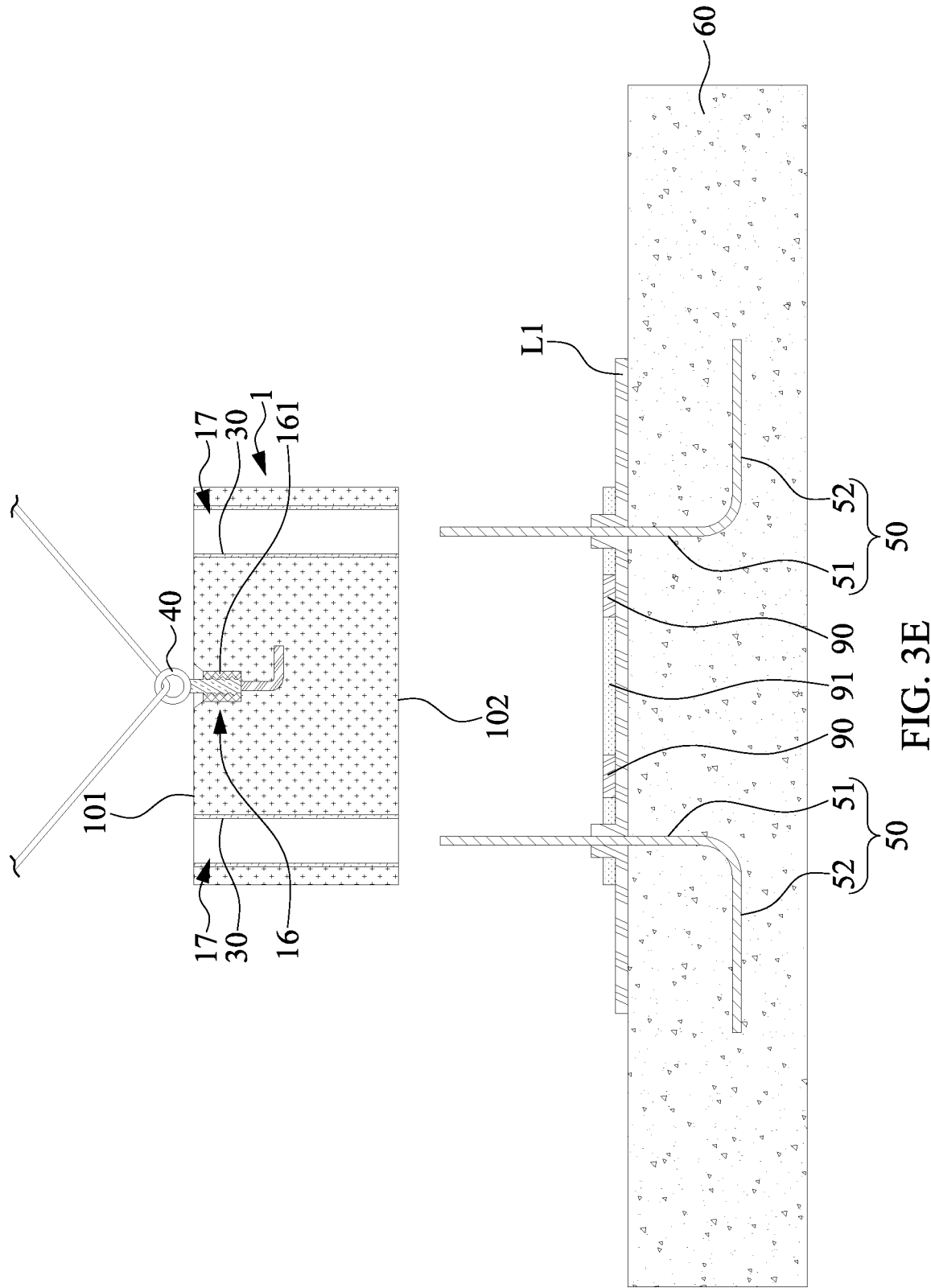
Figure 3F:
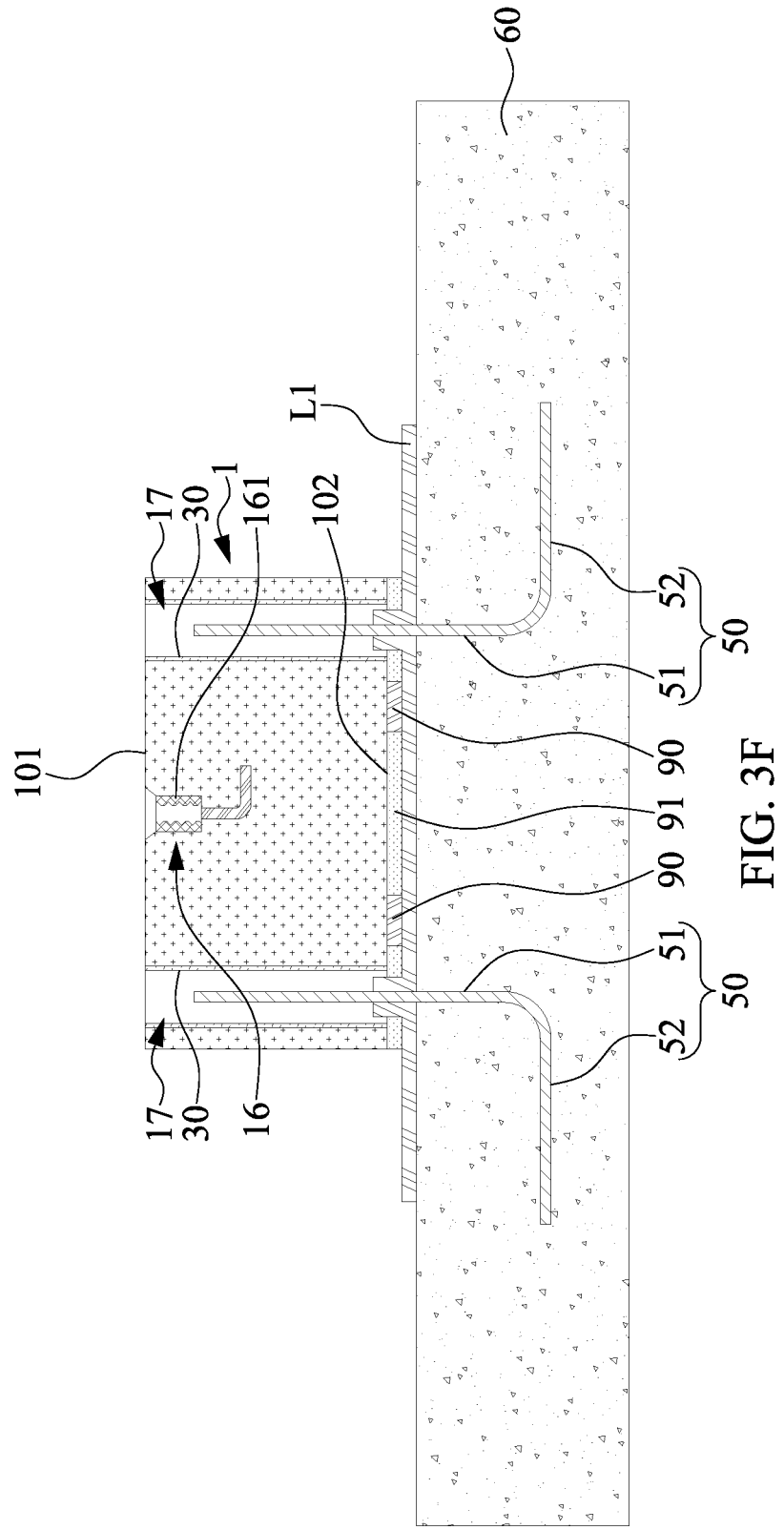
Figure 3G:
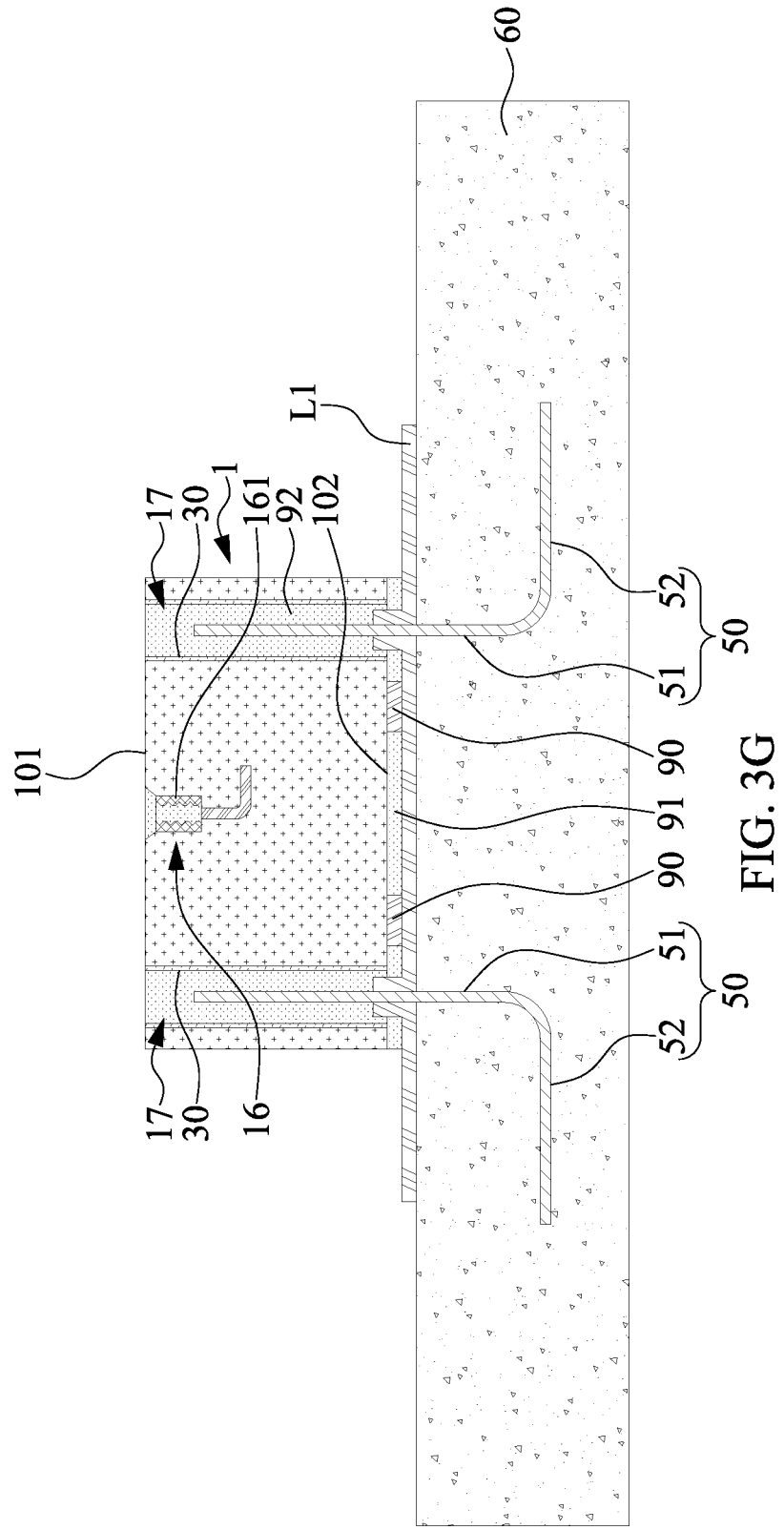

Please refer to FIGS. 3A to 3K, which are schematic views showing the method for mounting the precast base 1 at different stages according to the instant disclosure, including the following steps:

Step (a), as shown in FIG. 3A, includes embedding a plurality of reinforcement bars 50 into predetermined positions of the floor slab 60, such that a portion of each of the plurality of reinforcement bars 50 extends out of the floor slab 60. The plurality of reinforcement bars 50 are each substantially L-shaped, and comprise a first portion 51 and a second portion 52 that are substantially perpendicular to the first portion 51. When embedding the plurality of reinforcement bars 50 in the floor slab 60, the second portion 52 of the plurality of reinforcement bars 50 is completely embedded in the floor slab 60, while at least a portion of the first portion 51 of the plurality of reinforcement bars 50 extends out of the floor slab 60, for connecting the precast base 1 to the floor slab 60. As shown in FIG. 3B, a first waterproof coating L1 is applied to a predetermined position of the floor slab 60. The application of the first waterproof coating L1 includes first applying a two-component solvent-free epoxy resin, followed by applying a two-component solvent-free PU resin, and finally applying a single-component UV-resistant resin. As shown in FIG. 3C, after completing the first waterproof coating L1, a plurality of shims 90 is placed on the first waterproof coating L1. By disposing different thicknesses of shims 90, the angle of the top surface 101 of the precast base 1 (see FIG. 3F) relative to the floor slab 60 can be adjusted to ensure that the top surface 101 of the precast base 1 remains level. As shown in FIG. 3D, after completing the placement of the plurality of shims 90, a cement mortar is spread on the first waterproof coating L1 to completely cover the plurality of shims 90, forming a cement mortar layer 91. In one embodiment of the instant disclosure, the cement mortar is a non-shrink mortar.

Step (b), as shown in FIG. 3E, includes threadedly connecting the lifting ring 40 to the connecting portion 161 of the lifting part 16, and positioning the precast base 1 to the predetermined position of the floor slab 60, aligning the first portions 51 of a plurality of reinforcement bars 50 with a plurality of mounting holes 17 of the precast base 1. The step shown in FIG. 3F includes gradually lowering the precast base 1 during the lifting process, allowing the first portion 51 of the plurality of reinforcement bars 50 to pass through the respective mounting holes 17 of the precast base 1, and ensuring that the bottom surface 102 of the precast base 1 is firmly pressed against the cement mortar layer 91. The step shown in FIG. 3G includes filling the mounting holes 17 with cement mortar 92, completely covering the first portion 51 of the plurality of reinforcement bars 50, until the cement mortar levels the top surface 101 of the precast base 1. In one embodiment of the instant disclosure, the cement mortar 92 is a non-shrink mortar.

Figure 3H:
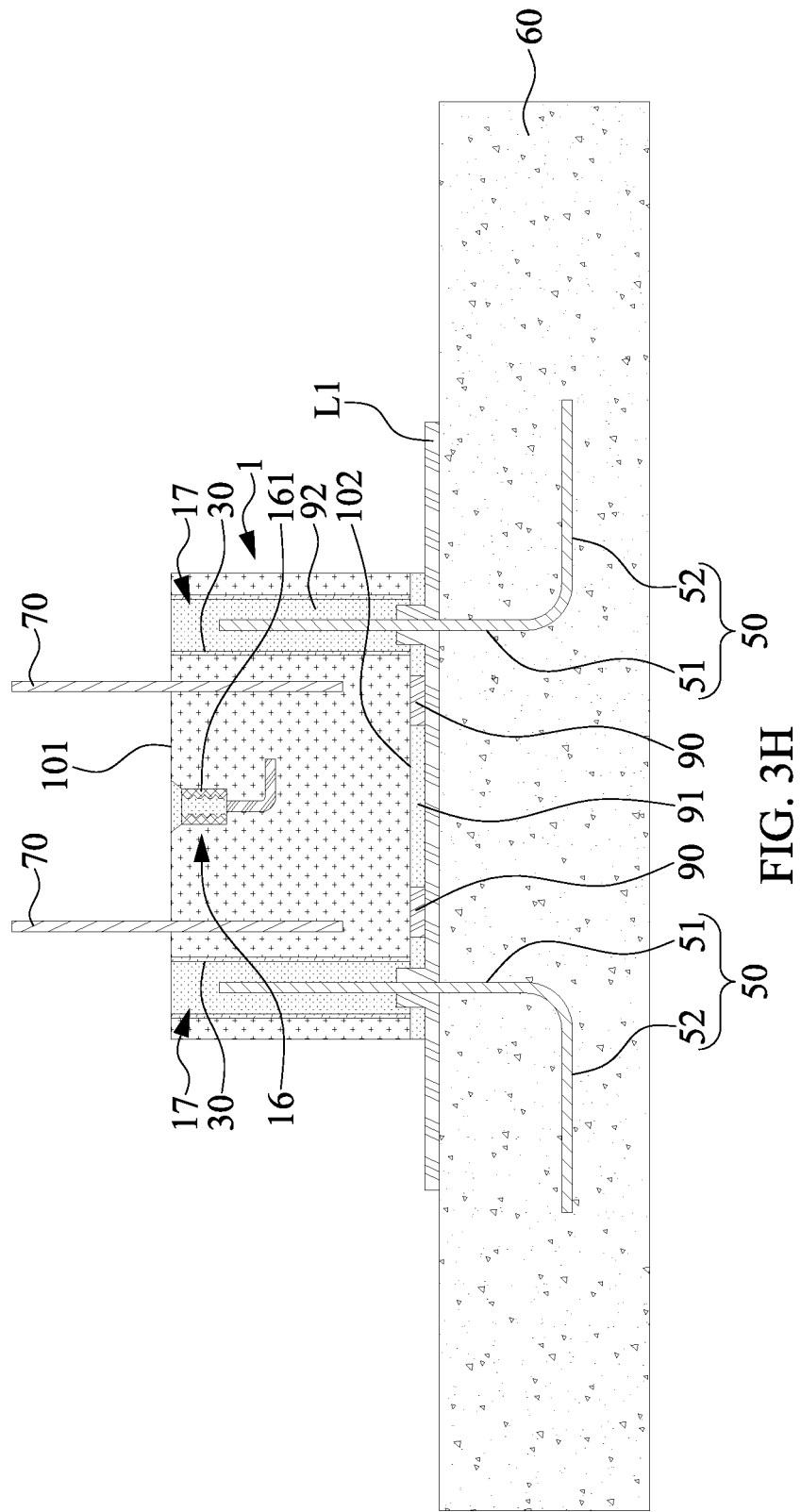
Figure 3I:
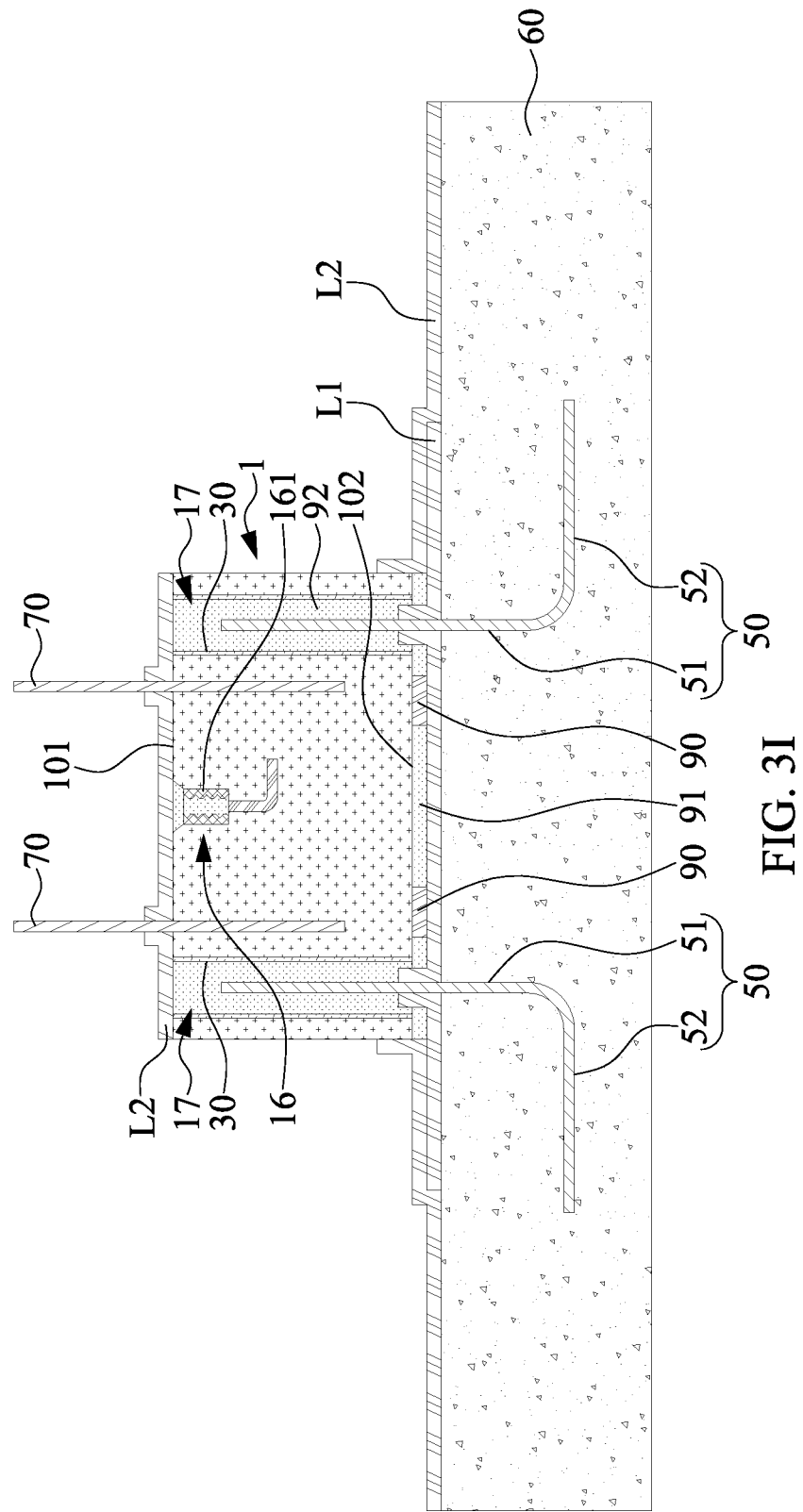
Figure 3K:
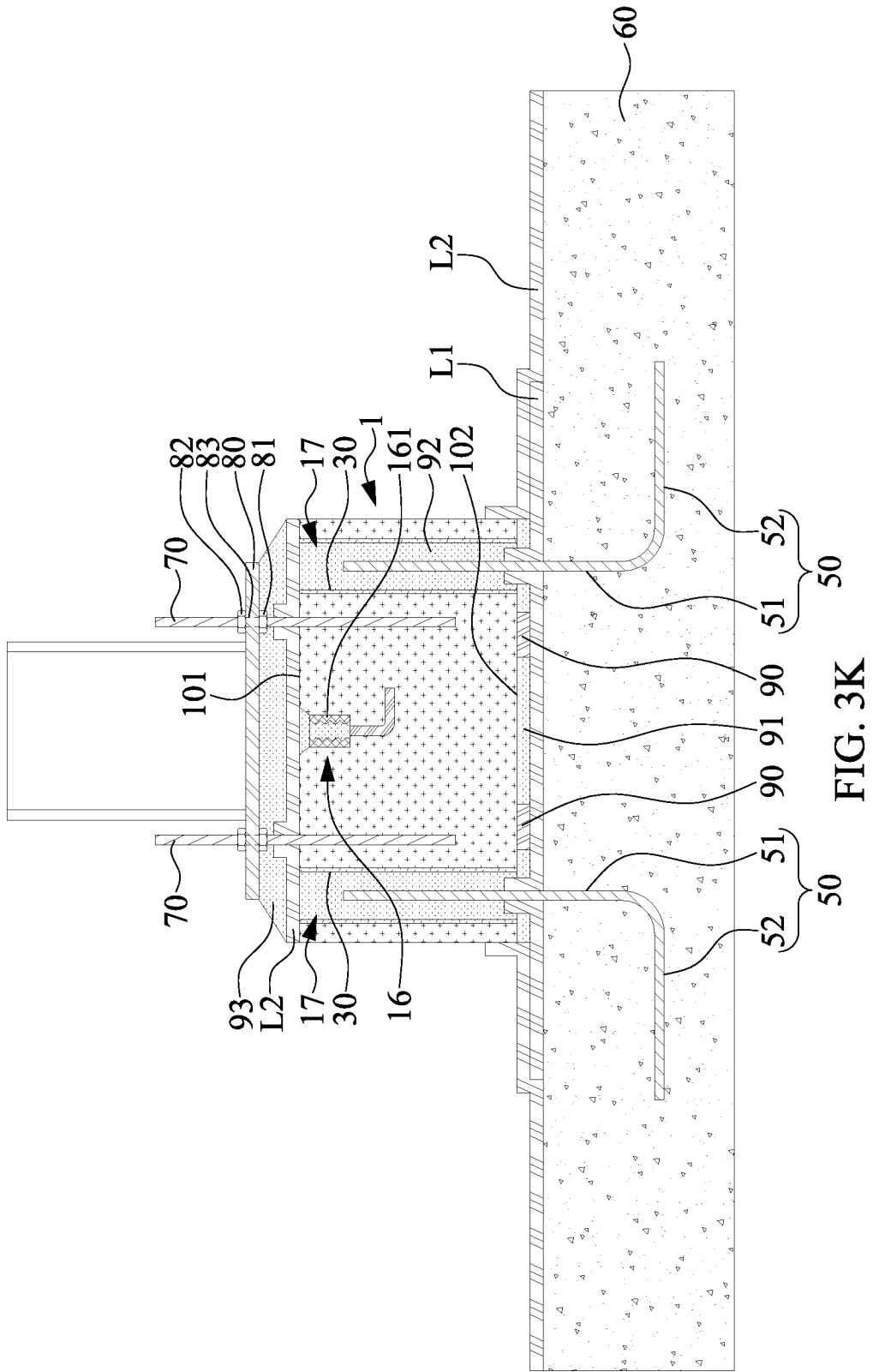

Step (c), as shown in FIG. 3H, includes installing a plurality of elongated support members 70 to the precast base 1, resulting in a portion of each of the plurality of elongated support members 70 being embedded and fixed in the precast base 1, while the other portion extends out of the top surface 101 of the precast base 1. In one embodiment of the instant disclosure, the elongated support members 70 extend out of the top surface 101 of the precast base 1 by approximately 40% to 60% of their total length. However, the above ratio is not intended to limit the instant disclosure, and the actual ratio can be adjusted according to the specific requirements of each case. In addition, the elongated support members 70 can be fixed to the precast base 1 by using chemical anchor bolts or expansion bolts. As shown in FIG. 3I, a second waterproof coating L2 is applied to the surface or top surface 101 of the precast base 1 and the predetermined position of the floor slab 60. The second waterproof coating L2 includes first applying a two-component solvent-free epoxy resin, followed by applying a two-component solvent-free PU resin, and finally applying a single-component UV-resistant resin.

As shown in FIG. 3J, step (d) includes: disposing a plurality of first bolts 81 at a first height of the plurality of elongated support members 70, respectively. Step (e) includes: disposing a supporting structure comprising a stand 80 with a plurality of through-holes 83 therein, allowing the plurality of elongated support members 70 to pass through the plurality of through-holes 83 of the stand 80, with the bottom of the stand 80 resting on the plurality of first bolts 81. The heights of the plurality of first bolts 81 can be adjusted to ensure the supporting structure remains level relative to the floor slab 60. Step (f) includes: disposing a plurality of second bolts 82 at a second height of the plurality of elongated support members 70, respectively, with the bottom of the plurality of second bolts 82 resting on the stand 80, wherein the second height is higher than the first height. Finally, the step shown in FIG. 3K includes filling the space between the bottom of the stand 80 and the top of the precast base 1 with cement mortar to form a cement mortar layer 93. In one embodiment of the instant disclosure, the cement mortar is a non-shrink mortar.

The terminology used in the description of the present disclosure is for the purpose of describing particular embodiments only, and is not intended to limit the disclosure. As used in the description of the disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items.

It shall be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The use of directional adjectives "above, "under," "upper," "lower," "below," "left," "right," "up," "down," "top," "bottom," "vertical," "horizontal," and like terms, are meant to assist with understanding relative relationships among design elements and should not be construed as meaning an absolute direction in space nor regarded as limiting. For example, in some embodiments, "a first component is on a second component" describes the first component being on the second component (the first component is directly on the second component), while some other components are between the first and second components.

Terms such as "approximately," "substantially," or "about" are applied to describe a small variation of a structural unit of an apparatus. When a term is used in conjunction with another term to describe a particular characteristic of the claimed disclosure, such term can indicate the exact events or circumstances, and similar exact events or circumstances.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A precast base comprising:
   a precast concrete body including a top surface and a bottom surface opposite to the top surface, and a plurality of mounting holes, each of the plurality of mounting holes penetrating from the top surface to the bottom surface of the precast concrete body;
   a plurality of corrugated steel pipes respectively embedded in the plurality of mounting holes; and
   a lifting part embedded in and close to the center of the top surface of the precast concrete body,
   wherein the precast concrete body is generally cuboid and comprises:
   a plurality of first U-shaped reinforcement bars disposed in parallel at equal intervals with their openings facing the bottom surface of the precast concrete body;
   a plurality of second U-shaped reinforcement bars disposed in parallel at equal intervals with their openings facing the bottom surface of the precast concrete body, wherein the plurality of first U-shaped reinforcement bars are substantially perpendicular to the plurality of second U-shaped reinforcement bars; and
   at least one third reinforcement bar surrounding and fixed to the sides of the plurality of first U-shaped reinforcement bars and the plurality of second U-shaped reinforcement bars;
   wherein the lifting part is fixed to the plurality of first U-shaped reinforcement bars through a fourth reinforcement bar.

2. The precast base according to claim 1, wherein,
the plurality of first U-shaped reinforcement bars each comprises:
a first portion extending in a Y-axis direction;
a second portion extending in the Y-axis direction; and
a third portion extending in a Z-axis direction and connecting ends of the first portion and the second portion; and wherein,
the plurality of second U-shaped reinforcement bars each comprises:
a first portion extending in the Y-axis direction;
a second portion extending in the Y-axis direction; and
a third portion extending in an X-axis direction and connecting ends of the first portion and the second portion, wherein the third portion of the first U-shaped reinforcement bar is substantially perpendicular to the third portion of the second U-shaped reinforcement bar.

3. The precast base according to claim 2, wherein the at least one third reinforcement bar is generally square in shape and fixed to the first portion and the second portion of the plurality of first U-shaped reinforcing bars, as well as the first portion and the second portion of the plurality of second U-shaped reinforcing bars.

4. The precast base according to claim 3, wherein the lifting part comprises:
a connecting part having internal threads therein for threadedly connecting a lifting ring;
a fixing part having a head section and a tail section connected perpendicularly to the head section, wherein the fourth reinforcement bar is fixed to the connecting part or the head section of the fixing part.

5. The precast base according to claim 4, further comprising a fifth reinforcement bar fixed to at least one of the head section or the tail section of the fixing part, at least one of the plurality of first U-shaped reinforcement bars, and at least one third reinforcement bar.

6. A method for manufacturing a precast base, comprising:
providing a mold with a space therein, and disposing a plurality of corrugated steel pipes at corners of the periphery of the space;
disposing in parallel a plurality of first U-shaped reinforcement bars at equal intervals in an X-axis direction, wherein openings of the plurality of first U-shaped reinforcement bars face a bottom of the space;
disposing in parallel a plurality of second U-shaped reinforcement bars at equal intervals in a Z-axis direction, wherein openings of the plurality of second U-shaped reinforcement bars face the bottom of the space, the plurality of second U-shaped reinforcement bars being substantially perpendicular to the plurality of first U-shaped reinforcement bars;
disposing at least one third reinforcement bar to surround and fix to the sides of the plurality of first U-shaped reinforcement bars and the plurality of second U-shaped reinforcement bars;
disposing a lifting part and fixing the lifting part to the plurality of first U-shaped reinforcement bars with a fourth reinforcement bar; and
pouring concrete into the space of the mold.

7. The method according to claim 6, further comprising, after the concrete has solidified, threadedly connecting a lifting ring to the lifting part, and exerting an upward force on the lifting ring, being in a Y-axis direction, to remove the precast base from the mold.

8. A method of installing an architectural structure, comprising:
(a) embedding a plurality of reinforcement bars at a predetermined position in a floor slab, wherein a portion of each of the plurality of reinforcement bars extends out of the floor slab;
(b) lifting a precast base to the predetermined position, the precast base including a precast concrete body with a top surface and a bottom surface opposite to the top surface, and a plurality of mounting holes, each of the plurality of mounting holes penetrating from the top surface to the bottom surface of the precast concrete body, a plurality of corrugated steel pipes respectively embedded in the plurality of mounting holes, and a lifting part embedded in and close to the center of the top surface of the precast concrete body such that the portion of the plurality of reinforcement bars is respectively inserted into the plurality of mounting holes of the precast base;
(c) disposing a plurality of elongated support members, wherein a portion of each of the plurality of elongated support members is fixedly inserted into the precast base, and the other portion extends out of the upper surface of the precast base;
(d) respectively disposing a plurality of first bolts at a first height on the plurality of elongated support members;
(e) disposing a supporting structure comprising a stand with a plurality of through-holes on the plurality of first bolts, such that the plurality of elongated support members are inserted through the plurality of through-holes of the stand, and a bottom of the stand rests on the plurality of first bolts; and
(f) respectively disposing a plurality of second bolts at a second height on the plurality of elongated support members, and a bottom of the plurality of second bolts rests on the stand.

9. The method according to claim 8, after step (a), further comprising applying a first waterproof coating at the predetermined position of the floor slab,
wherein applying the first waterproof coating comprises first applying a two-component solvent-free epoxy resin, followed by applying a two-component solvent-free PU resin, and finally applying a single-component UV-resistant resin.

10. The method according to claim 9, further comprising after completing the first waterproof coating, disposing a plurality of shims on the first waterproof coating, and before step (b), spreading cement mortar on the first waterproof coating.

11. The method according to claim 8, after step (b), further comprising filling the plurality of mounting holes with cement mortar, and after step (f), pouring cement mortar between the bottom of the stand and a top surface of the precast base.

12. The method according to claim 8, after step (c), further comprising applying a second waterproof coating on the surface of the precast base and the predetermined position of the floor slab, wherein applying the second waterproof coating comprises first applying a two-component solvent-free epoxy resin, followed by applying a two-component solvent-free PU resin, and finally applying a single-component UV-resistant resin.

* * * * *